US00RE46219E

(19) United States
(12) Reissued Patent
Kates

(10) Patent Number: US RE46,219 E
(45) Date of Reissued Patent: Nov. 29, 2016

(54) METHOD AND APPARATUS FOR ENERGY-EFFICIENT TEMPERATURE-BASED SYSTEMS MANAGEMENT

(71) Applicant: Nest Labs, Inc., Palo Alto, CA (US)

(72) Inventor: Lawrence Kates, Corona Del Mar, CA (US)

(73) Assignee: GOOGLE INC., Moutain View, CA (US)

(21) Appl. No.: 14/010,305

(22) Filed: Aug. 26, 2013

Related U.S. Patent Documents

Reissue of:
(64) Patent No.: 8,014,902
Issued: Sep. 6, 2011
Appl. No.: 12/036,153
Filed: Feb. 22, 2008

(51) Int. Cl.
*G01M 1/38* (2006.01)
*E04H 4/12* (2006.01)
*H02J 3/14* (2006.01)

(52) U.S. Cl.
CPC ..... *E04H 4/129* (2013.01); *H02J 3/14* (2013.01)

(58) Field of Classification Search
CPC ..... Y02B 70/3266; E04H 4/1209; E04H 4/1245; E04H 4/129; H02J 3/14
USPC ..... 700/22, 44, 45, 294, 295
See application file for complete search history.

(56) References Cited

U.S. PATENT DOCUMENTS 3,925,680 A 12/1975 Dixon
4,027,171 A 5/1977 Browder et al.
4,217,646 A 8/1980 Caltagirone et al.
4,349,879 A 9/1982 Peddie et al.
4,389,577 A 6/1983 Anderson et al.
4,847,781 A 7/1989 Brown, III et al.

(Continued)

FOREIGN PATENT DOCUMENTS

WO 2004/061372 7/2004
WO WO 2004/061372 A2 7/2004
WO 2010/033563 3/2010

OTHER PUBLICATIONS

Arens, "New Thermostat Demand Response Enabling Technology," Poster, Jun. 10, 2004, University of California Berkeley.

(Continued)

*Primary Examiner* — Russell D. Stormer
(74) *Attorney, Agent, or Firm* — Van Court & Aldridge LLP

(57) ABSTRACT

A system for load control in an electrical power system is described, wherein one or more temperature-monitoring devices are provided to control operation of a pool pump. When ambient temperatures are relatively high, and thus, electrical power demands from air conditioning systems are relatively high, the temperature-monitoring devices can remove power from the controlled device during the hottest portions of the day. The temperature-monitoring devices can provide power to the controlled devices during the cooler portions of the day. During heat waves or other periods of relatively continuous high heat, the temperature-monitoring devices can schedule power to the controlled devices to reduce overall power demands and to run the controlled devices during the cooler portions of the day when air conditioning electrical loads are reduced. The temperature-monitoring devices can also coordinate operation of the pool pump and a pool heater.

24 Claims, 18 Drawing Sheets

(56) References Cited

U.S. PATENT DOCUMENTS

| | | | | |
|---|---|---|---|---|
| 5,430,430 | A | 7/1995 | Gilbert | |
| 5,462,225 | A | 10/1995 | Massara et al. | |
| 5,481,140 | A | 1/1996 | Maruyama et al. | |
| 5,502,339 | A | 3/1996 | Hartig | |
| 5,544,036 | A | 8/1996 | Brown, Jr. et al. | |
| 5,572,438 | A | 11/1996 | Ehlers et al. | |
| 5,675,503 | A | 10/1997 | Moe et al. | |
| 5,687,139 | A | 11/1997 | Budney | |
| 5,816,491 | A | 10/1998 | Berkeley et al. | |
| 5,894,392 | A | 4/1999 | McDonald | |
| 6,109,050 | A | 8/2000 | Zakryk | |
| 6,122,603 | A | 9/2000 | Budike, Jr. | |
| 6,181,985 | B1 | 1/2001 | O'Donnell et al. | |
| 6,204,623 | B1 | 3/2001 | Levy et al. | |
| 6,216,956 | B1 | 4/2001 | Ehlers et al. | |
| 6,228,272 | B1 * | 5/2001 | Gola | 210/742 |
| 6,311,105 | B1 | 10/2001 | Budike, Jr. | |
| 6,444,129 | B1 * | 9/2002 | Collins | C02F 1/008 210/138 |
| 6,487,509 | B1 | 11/2002 | Aisa | |
| 6,507,273 | B1 | 1/2003 | Chang et al. | |
| 6,574,581 | B1 | 6/2003 | Bohrer et al. | |
| 6,609,048 | B2 | 8/2003 | Matsuo et al. | |
| 6,624,532 | B1 | 9/2003 | Davidow et al. | |
| 6,643,567 | B2 | 11/2003 | Kolk et al. | |
| 6,671,586 | B2 | 12/2003 | Davis et al. | |
| 6,721,672 | B2 | 4/2004 | Spitaels et al. | |
| 6,785,630 | B2 | 8/2004 | Kolk et al. | |
| 6,799,091 | B2 | 9/2004 | Bradford | |
| 6,832,135 | B2 | 12/2004 | Ying | |
| 6,853,291 | B1 | 2/2005 | Aisa | |
| 6,975,958 | B2 | 12/2005 | Bohrer et al. | |
| 7,010,363 | B2 | 3/2006 | Donnelly et al. | |
| 7,032,119 | B2 | 4/2006 | Fung | |
| 7,106,565 | B2 | 9/2006 | Kase et al. | |
| 7,149,605 | B2 | 12/2006 | Chassin et al. | |
| 7,289,887 | B2 | 10/2007 | Rodgers | |
| 7,346,467 | B2 | 3/2008 | Bohrer et al. | |
| 2002/0024332 | A1 | 2/2002 | Gardner | |
| 2002/0162032 | A1 | 10/2002 | Gundersen et al. | |
| 2003/0020333 | A1 | 1/2003 | Ying | |
| 2003/0126253 | A1 | 7/2003 | Ewing et al. | |
| 2003/0168516 | A1 | 9/2003 | Cline | |
| 2004/0095237 | A1 | 5/2004 | Chen et al. | |
| 2004/0117330 | A1 | 6/2004 | Ehlers et al. | |
| 2005/0119793 | A1 | 6/2005 | Amundson et al. | |
| 2005/0216131 | A1 | 9/2005 | Sodemann et al. | |
| 2006/0041655 | A1 * | 2/2006 | Holloway et al. | 709/223 |
| 2006/0049694 | A1 | 3/2006 | Kates | |
| 2006/0052906 | A1 | 3/2006 | Kates | |
| 2006/0095164 | A1 | 5/2006 | Donnelly et al. | |
| 2006/0229768 | A1 | 10/2006 | Chassin et al. | |
| 2007/0244576 | A1 * | 10/2007 | Potucek et al. | 700/55 |
| 2007/0299562 | A1 | 12/2007 | Kates | |
| 2008/0015740 | A1 | 1/2008 | Osann, Jr. | |
| 2008/0019068 | A1 | 1/2008 | Reynolds et al. | |
| 2008/0147243 | A1 | 6/2008 | Rodgers | |
| 2008/0168599 | A1 * | 7/2008 | Caudill et al. | 4/541.1 |
| 2009/0151801 | A1 * | 6/2009 | Gorman et al. | 137/565.11 |
| 2009/0160267 | A1 | 6/2009 | Kates | |
| 2009/0187499 | A1 * | 7/2009 | Mulder et al. | 705/30 |
| 2010/0282857 | A1 | 11/2010 | Steinberg | |
| 2011/0106328 | A1 | 5/2011 | Zhou et al. | |
| 2012/0089523 | A1 | 4/2012 | Hurri et al. | |

OTHER PUBLICATIONS

Arens et al., "Demand Response Enabling Technology Development," Phase I Report: Jun. 2003-Nov. 2005, pp. 1-108, University of California Berkeley, Apr. 4, 2006.

Arens et al., "Demand Response Electrical Appliance Manager User Interface Design, Development and Testing," Poster, Demand Response Enabling Technology Development, University of California Berkeley.

Arens et al., "Demand Response Enabled Thermostat Control Strategies and Interface," Poster, Demand Response Enabling Technology Development, University of California Berkeley.

Auslander et al., "UC Berkeley DR Research Energy Management Group," Power Point Presentation, DR ETD Workshop, Jun. 11, 2007, pp. 1-35, State of California Energy Commission.

Chen et al., "Demand Response-Enabled Residential Thermostat Controls," ACEEE Summer Study on Energy Efficiency in Buildings, 2008, pp. 1-24 through 1-36, Mechanical Engineering Dept., and Architecture Dept., University of California Berkeley.

De Almeida et al., "Advanced Monitoring Technologies for the Evaluation of Demand-Side Management Programs," Energy, vol. 19, No. 6, pp. 661-678, 1994.

Gevorkian, "Alternative Energy Systems in Building Design," pp. 195-200, 2009.

Hoffman et al., "Integration of Remote Meter Reading, Load Control, and Monitoring of Customers' Installations for Customer Automation with Telephone Line Signalling," pp. 421-424, 1989.

Martinez, "SCE Energy$mart Thermostat Program," 20 pages, Oct. 5, 2004.

Matty, "Advanced Energy Management for Home Use," IEEE Transactions on Consumer Electronics, vol. 35, No. 3, pp. 584-588, Aug. 1989.

Motegi et al., "Introduction To Commercial Building Control Strategies and Techniques for Demand Response—Appendices," 35 pages, May 22, 2007.

Peffer et al., "Smart Comfort At Home: Design of a residential thermostat to achieve thermal comfort, and save money and peak energy," Poster, Mar. 2007, University of California Berkeley.

Peffer et al., "A Tale of Two Houses: The Human Dimension of Demand Response Enabling Technology from a Case Study of Adaptive Wireless Thermostat," ACEEE Summer Study on Energy Efficiency in Buildings, 2008, pp. 7-242 through 7-253, Architecture Dept. and Mechanical Engineering Dept., University of California Berkeley.

Population Research Systems, SCE Energy$mart Thermostat Study, pp. 1-51, Nov. 10, 2004.

Wright, "DR ETD Summary of New Thermostat, TempNode, & New Meter (UC Berkeley Project)," Power Point Presentation, Public Interest Energy Research, pp. 1-49, University of California Berkeley.

International Search Report from PCT/US2008/061916 dated Oct. 27, 2008, 4 pages.

Office Action dated Jul. 11, 2008 from Related U.S. Appl. No. 10/934,954.

Advisory Action dated May 12, 2008 from Related U.S. Appl. No. 10/934,309.

Office Action dated Oct. 2, 2008 from Related U.S. Appl. No. 10/934,309.

Office Action dated Aug. 7, 2008 from Related U.S. Appl. No. 11/426,548.

Office Action dated Apr. 20, 2007 from Related U.S. Appl. No. 10/934,954.

Office Action dated Jan. 29, 2008 from Related U.S. Appl. No. 10/934,954.

Office Action dated Sep. 22, 2005 from Related U.S. Appl. No. 10/934,309.

Office Action dated Jan. 13, 2006 from Related U.S. Appl. No. 10/934,309.

Office Action dated Aug. 28, 2006 from Related U.S. Appl. No. 10/934,309.

Office Action dated Feb. 12, 2007 from Related U.S. Appl. No. 10/934,309.

Office Action dated May 24, 2007 from Related U.S. Appl. No. 10/934,309.

Office Action dated Feb. 26, 2008 from Related U.S. Appl. No. 10/934,309.

Office Action dated Feb. 27, 2008 from Related U.S. Appl. No. 11/426,548.

Office Action dated Dec. 31, 2008 from Related U.S. Appl. No. 10/934,954.

Office Action dated Jun. 29, 2009 from Related U.S. Appl. No. 12/368,243.

Office Action dated Aug. 3, 2009 from Related U.S. Appl. No. 10/934,954.

* cited by examiner

METHOD AND APPARATUS FOR ENERGY-EFFICIENT TEMPERATURE-BASED SYSTEMS MANAGEMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

REFERENCE TO RELATED APPLICATION

*More than one reissue application has been filed for U.S. Pat. No. 8,014,902. The reissue applications are this application which is an application for reissue of U.S. Pat. No. 8,014,902, and Ser. No. 14/732,378 filed Jun. 5, 2016 which is a divisional and a reissue of this application.*

Background

1. Field of the Invention

The invention relates to systems for managing systems such as, for example, swimming pool heaters and/or pumps based on temperature.

2. Description of the Related Art

The increasing demand for electrical energy often produces overload conditions on many electric power distribution systems, particularly during periods of extreme temperatures when consumers are calling for high levels of energy to satisfy their cooling needs. When the customers' demand for energy reaches a given high level, communities are forced to endure rolling blackouts.

Severe power shortages increase the risk of damage to electrical and electronic equipment. Brownouts can occur at times of extremely high power consumption or power shortages when electric utilities reduce the voltage supply to conserve energy. Brownouts can cause computer resets, memory loss, data loss, and in some cases, overheat electronic equipment components. Motors (e.g., fan motors and air-conditioner motor compressors) can also overheat and burn out. Blackouts are sustained power interruptions caused by overloads, storms, accidents, malfunctions of utility equipment, or other factors. Longer-term power outages can last from hours to days.

At present, the typical procedure often used to prevent brownouts and widespread blackouts is to institute rolling blackouts. Rolling blackouts reduce the stress on the electrical power grid, but they are very disruptive to businesses and personal lives. Electrical and electronic equipment is often damaged after a utility brownout or blackout when the power is turned back on and a burst of electricity surges through the lines. Equipment can fail because of a sudden lack of power, lower voltage levels, and power surges when service is restored.

In addition, swimming pools and/or spas typically use considerable amounts of energy to run filter pumps and to run heaters. Current control systems do not coordinate operation of the pumps and heaters in a manner that conserves energy while still maintaining the temperature and quality of the water.

SUMMARY

These and other problems are solved by a system for load control in an electrical power system where one or more load-control devices are provided to reduce system load by selectively shutting down relatively high-load equipment such as, for example, pool pumps, ovens, etc., during periods of relatively high ambient temperature and/or to reduce energy used by a pool heater. In one embodiment, the load control devices are configured to measure ambient temperature (or receive ambient temperature data) and using the temperature data, at least in part, for controlling the relatively high-load system. In one embodiment, a power authority, such as a power utility, governmental agency, power transmission company, and/or authorized agent of any such bodies, can send one or more commands to the data interfaced devices to adjust loading on the electrical power system. The ability to remotely shut down electrical equipment allows the power authority to provide an orderly reduction of power usage. Power surges can be avoided because the remote shutdown facility can schedule a staggered restart of the controlled equipment. The power load can be reduced in an intelligent manner that minimizes the impact on businesses and personal lives. In one embodiment, power usage is reduced by first shutting down relatively less important equipment, such as, for example, pool filter pumps, hot water heaters, electric ovens, etc. If further reduction in load is required, the system can also shut down relatively more important equipment such as, for example, refrigerators, air-conditioners, and the like on a rolling basis. Relatively less important equipment (and other equipment that can be run during the night or other low-load periods) such as pool filter pumps, electric water heaters, ovens, etc., can be shut down during periods of relatively high temperature (e.g., during the hotter part of the day) when air conditioning loads are relatively high. The relatively less important equipment can then be schedule to run during the night or morning when temperatures are cooler and air conditioning power loads are lower.

In one embodiment, the system shuts down electrical equipment devices according to a device type (e.g., pool pump, oven, hot water heater, air-conditioner, etc.). In one embodiment, the system shuts down electrical equipment by device type in an order that corresponds to the relative importance of the device. In one embodiment, the system shuts down electrical equipment for a selected period of time. In one embodiment, the time period varies according to the type of device. In one embodiment, relatively less important devices are shut down for longer periods than relatively more important device.

In one embodiment, the system sends commands to instruct electrical devices to operate in a low-power mode (or high-efficiency mode) before sending a full shutdown command.

In one embodiment, the power authority sends shutdown commands. In one embodiment, the power authority sends commands to instruct the high-load system to operate in a relatively low-power mode. In one embodiment, the commands are time-limited, thereby, allowing the electrical equipment to resume normal operation after a specified period of time. In one embodiment, the commands include query commands to cause the high-load system to report operating characteristics (e.g., efficiency, time of operation, etc.) back to the power authority.

In one embodiment, the system sends shutdown and startup commands. In one embodiment, the system sends shutdown commands that instruct electrical equipment to shut down for a specified period of time. In one embodiment, the shutdown time is randomized to reduce power surges when equipment restarts.

In one embodiment, power line data transmission (also referred to as current-carrier transmission) is used to send commands, (e.g., shutdown commands, startup commands, etc.), ambient temperature information, etc. In one embodiment, a signal injector injects power line data transmission signals onto a power line.

In one embodiment, a temperature signal injector is provided. The temperature signal injector sends ambient temperature information to indoor devices (e.g., hot water heaters, etc.).

One embodiment includes a pump, a control system configured to receive water temperature data from water in a pool serviced by the pump, and a heater that heats the water, the controller calculating a start time to turn on the heater and the pump such that the water will be at a desired temperature at a desired future time, the control system calculating filtration times to run the pump before the start time, the filtration times computed based at least in part on the start time and at least in part on a desired average, the control system running the pump during the filtration times, the control system activating the heater at the start time.

In one embodiment, the control system can receive a shutdown command.

In one embodiment, the control system can receive a command to shutdown for a specified period of time.

In one embodiment, the apparatus further comprising a modem.

In one embodiment, the apparatus further comprising a power line modem.

In one embodiment, the apparatus further comprising a wireless modem.

In one embodiment, the control system controls an operating speed of the pump.

In one embodiment, the control system operates the pump at a relatively higher speed when the heater is activated.

In one embodiment, the control system operates the pump relatively less on days when the heater is not activated.

In one embodiment, the control system operates the pump for at least a specified amount of time during a 24-hour period.

In one embodiment, the control system the operates the pump at specified times during relatively moderate ambient temperature conditions.

In one embodiment, the control system calculates the filtration time to correspond to periods of expected relatively moderate ambient temperature conditions.

In one embodiment, ambient temperature data is provided by a temperature sensor provided to the control system.

In one embodiment, a power line networking modem is configured to receive the ambient temperature data and provide the ambient temperature data to the control system.

In one embodiment, a wireless receiver is configured to receive ambient temperature data and provide the ambient temperature data to the control system.

In one embodiment, the control system provides power to the pump according to ambient temperature conditions and according to how much time power has been provided to the pump during a specified time period.

In one embodiment, the desired average is computed over a 24-hour time period.

In one embodiment, the desired average is computed over a one week time period.

In one embodiment, the desired average is computed over a time period specified by a user.

In one embodiment, the control system operates the pump according to a user-specified schedule during periods of relatively moderate ambient temperature, and the control system operates the pump during relatively cooler portions of the day during periods of relatively high ambient temperature.

In one embodiment, the control system operates the pump according to a user-specified schedule during periods of relatively moderate ambient temperature, the apparatus configured to provide power to the water pump during relatively cooler portions of the day during periods of relatively high ambient temperature, the controller providing power to the pump for relatively shorter periods when the ambient temperature exceeds a specified temperature.

In one embodiment, a display system provides monitoring of electrical devices and/or displays messages from a power authority.

In one embodiment, a power meter provides load control capability. In one embodiment, a load control module is configured for use in connection with a standard power meter.

In one embodiment, an electric distribution system provides automatic downstream load control.

DETAILED DESCRIPTION

Figure 1:
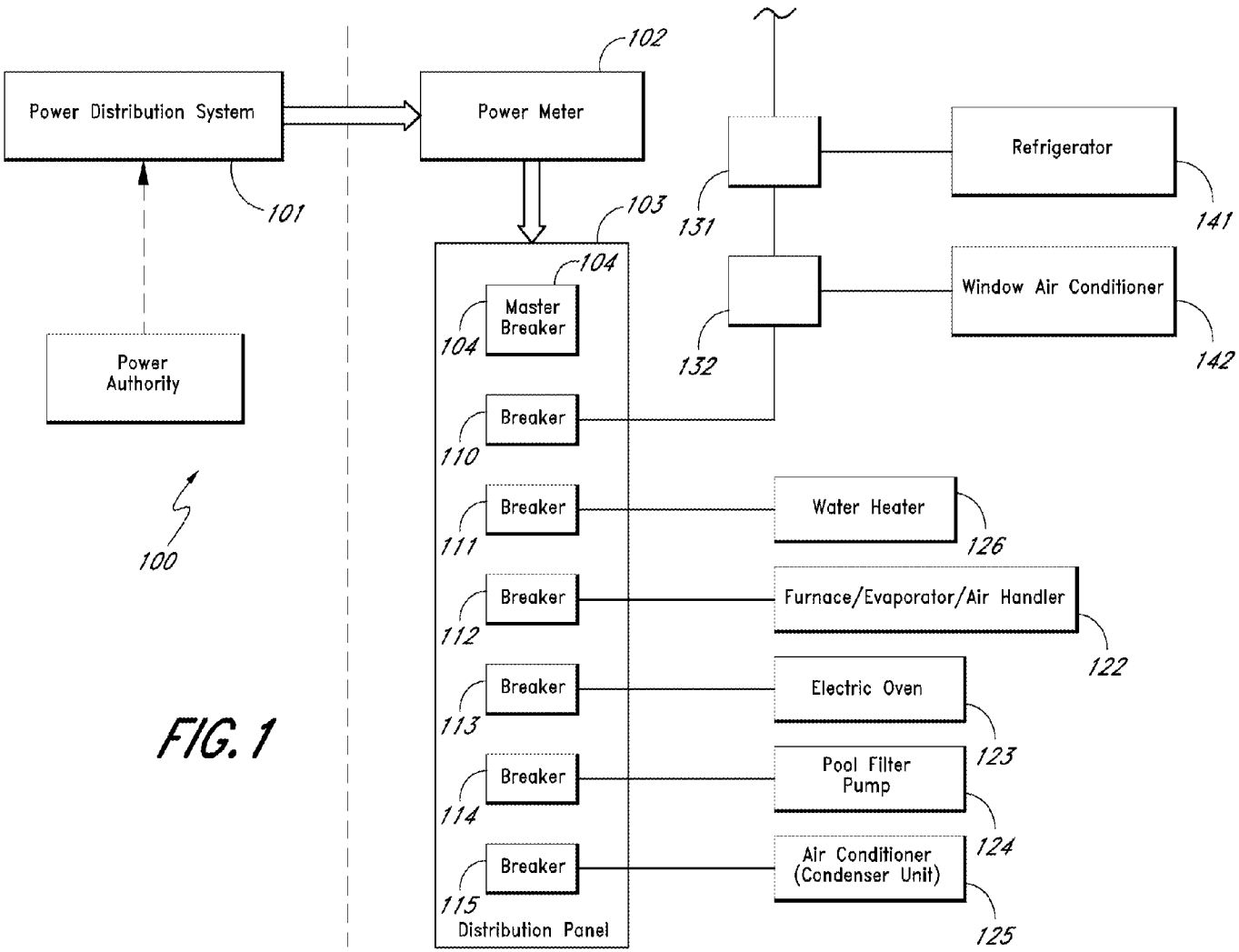
FIG. 1 shows a power distribution system for a home or commercial structure.

FIG. 1 shows an electrical system 100 for a home or commercial structure. In the system 100, electrical power from a distribution system 101 is provided to a power meter 102. The power meter 102 measures electrical power provided to a distribution panel 103. In the distribution panel 103, power from the meter 102 is provided to a master circuit breaker 104. Electrical power from the master circuit breaker 104 is provided to various branch circuit breakers 110-115. The branch circuit breakers 110-115 provide electric power to various branch circuits in the home or commercial structure. It is common practice to provide a dedicated branch circuit breaker to relatively high-load devices, such as, for example, electric dryers, electric ovens, electric ranges, electric water heaters, electric furnaces, building air-conditioners, pool filter pumps, etc. Thus, for example, in FIG. 1, the breaker 112 provides electrical power to a furnace/evaporator/air-handler unit, the breaker 113 provides power to an electric oven 123, the breaker 114 provides power to a pool filter pump 124, the breaker 115 provides power to an air-conditioner condenser unit 125, and the breaker 111 provides power to an electric water heater 126. The relatively high-load devices on dedicated circuit breakers are typically devices that operate at higher voltage (e.g., on 220 volts in the U.S.) and thus, the dedicated circuit breakers 110-115 are typically double-pole breakers that switch both "hot" lines in a split-phase system.

The breaker 110 provides electrical power to a string of electrical outlets 131-132. It is also common practice to provide a single branch circuit breaker to a plurality of electrical outlets for powering relatively low-load electrical devices (e.g., computers, window air-conditioners, refrigerators, lights, entertainment systems, etc.). Thus, for example, FIG. 1 shows a refrigerator 141 plugged into the electrical outlet 131 and a window air-conditioner 142 unit plugged into the electrical outlet 132.

The individual electric power provided to the relatively high-load devices connected to dedicated breakers can be controlled at the relatively high-load device and/or at the dedicated breaker. The individual electric power provided to the relatively low-load devices connected to electrical outlets can be controlled at the outlet and/or in the relatively low-load device. It is typically not practical to control power to the relatively low-load devices at a breaker that serves more than one device.

Figure 2A:
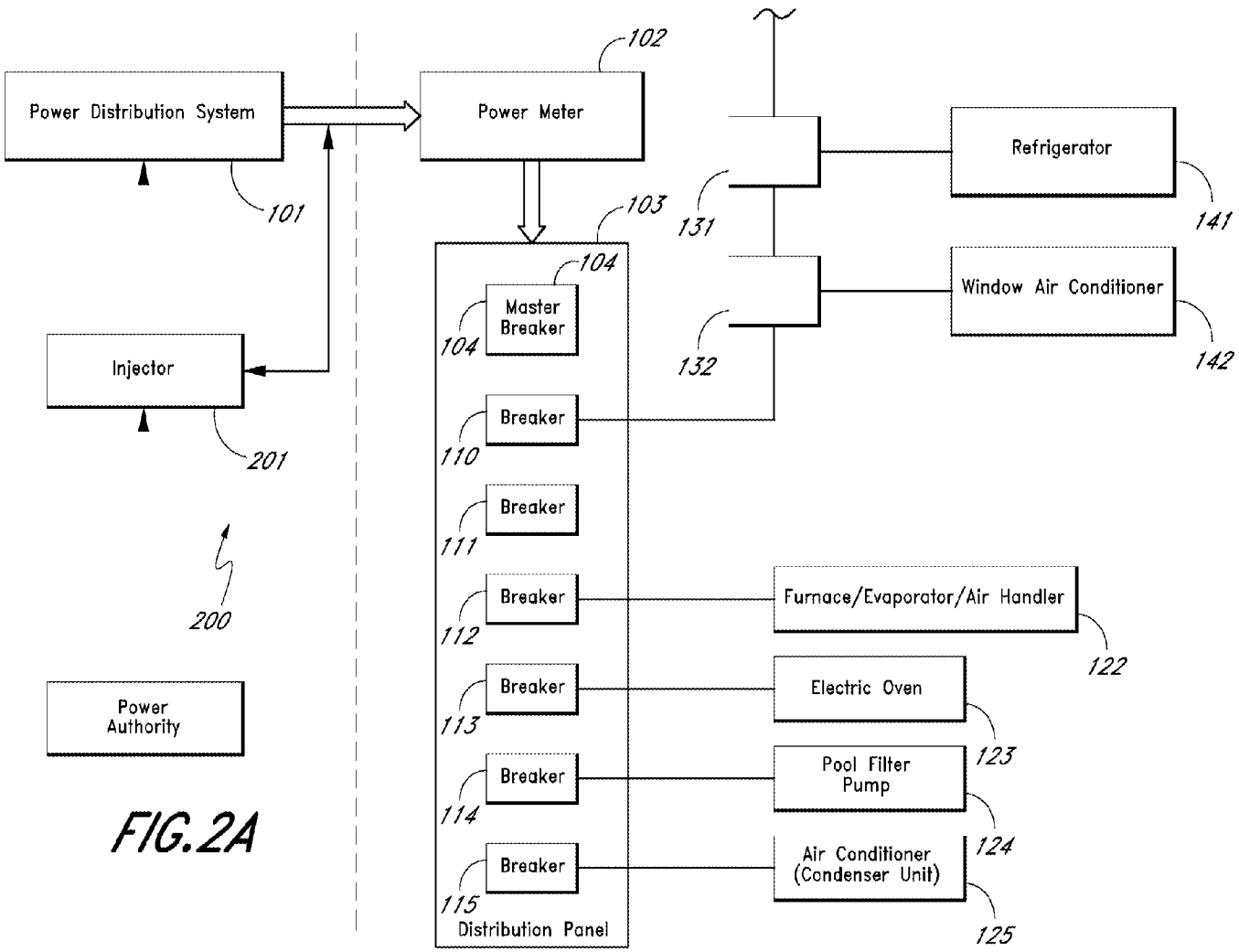
FIG. 2A shows a power distribution system for a home or commercial structure wherein an injector provides power line communications.

FIG. 2A shows a power distribution system 200 for a home or commercial structure wherein an injector 201 provides power line communications. The injector 201 inserts modulated data signals onto the power line at frequencies other than the 60 Hz (or 50 Hz) frequency used by the power line. In broadband applications, such as, for example, Broadband Power Line (BPL) communications, the data signals are modulated onto carriers in the megahertz range and higher. In medium-bandwidth systems, the carrier frequencies are in the band between approximately a kilohertz range and a megahertz. In relatively low-bandwidth systems, the carriers operate at frequencies below a kilohertz. The relatively high-bandwidth, medium bandwidth, and relatively low-bandwidth systems can typically operate simultaneously without interfering with one another as long as the frequency ranges used by the systems do not overlap. Thus, for example, BPL can typically operate in the presence of a medium-bandwidth system that uses carriers in the frequencies below those used by BPL. Similarly, the medium bandwidth system can typically operate in the presence of a low-bandwidth system that uses frequencies below those used by the medium-bandwidth system.

Figure 2B:
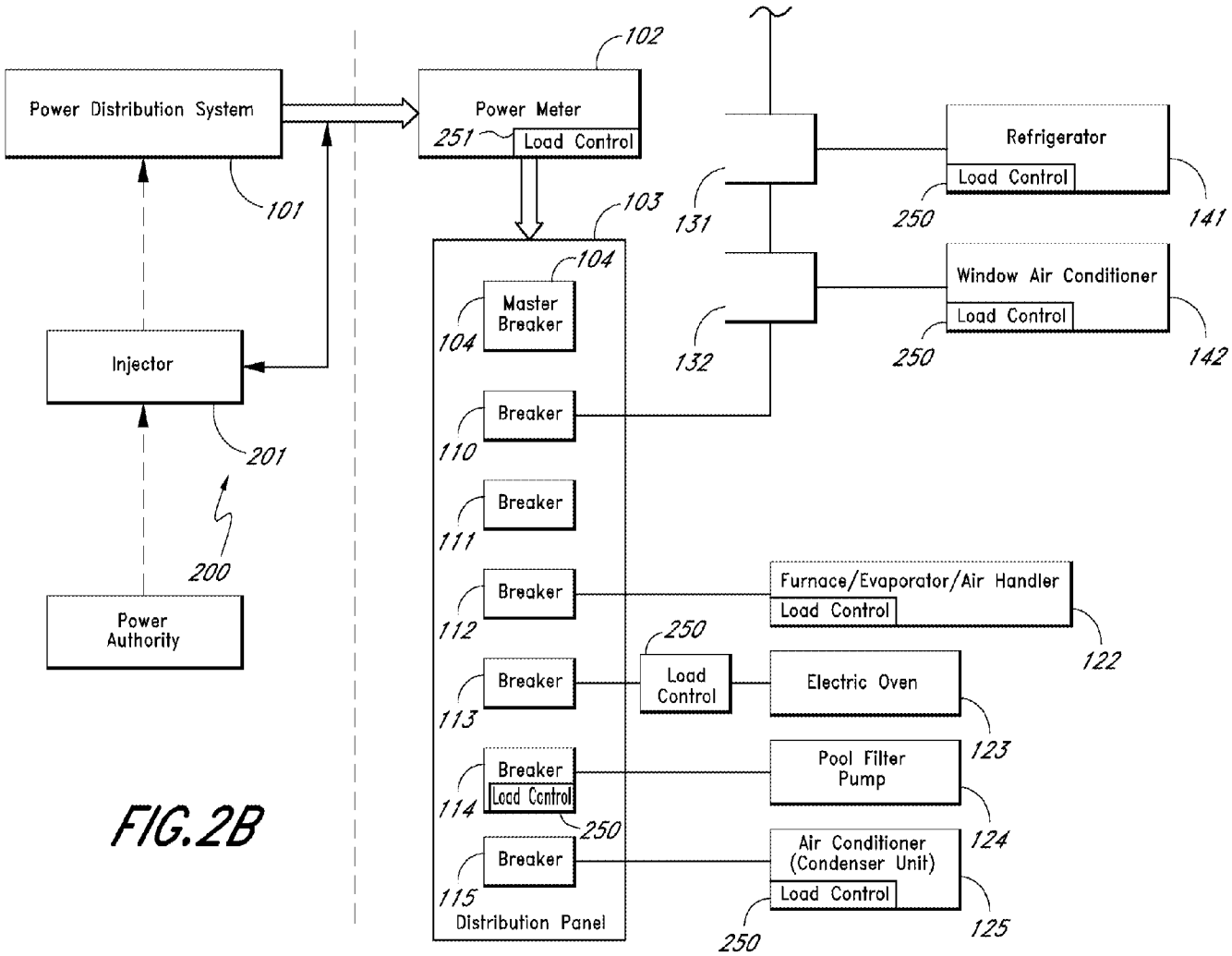
FIG. 2B shows a power distribution system for a home or commercial structure wherein load-control modules are provided to allow the power authority to shed power system loads by remotely switching off certain electrical equipment.

FIG. 2B shows a power distribution system for a home or commercial structure wherein load-control modules 250 are provided to allow the power authority to shed power system loads by remotely switching off certain electrical equipment. The power authority can send commands to the load control modules to shut off electrical equipment by type and/or by identification number. Embodiments of the load-control modules are described in connection with FIGS. 3-5 and 7-10. In one embodiment, a load monitoring module 251 is provided to monitor and control power provided to the distribution box 103.

Figure 3:
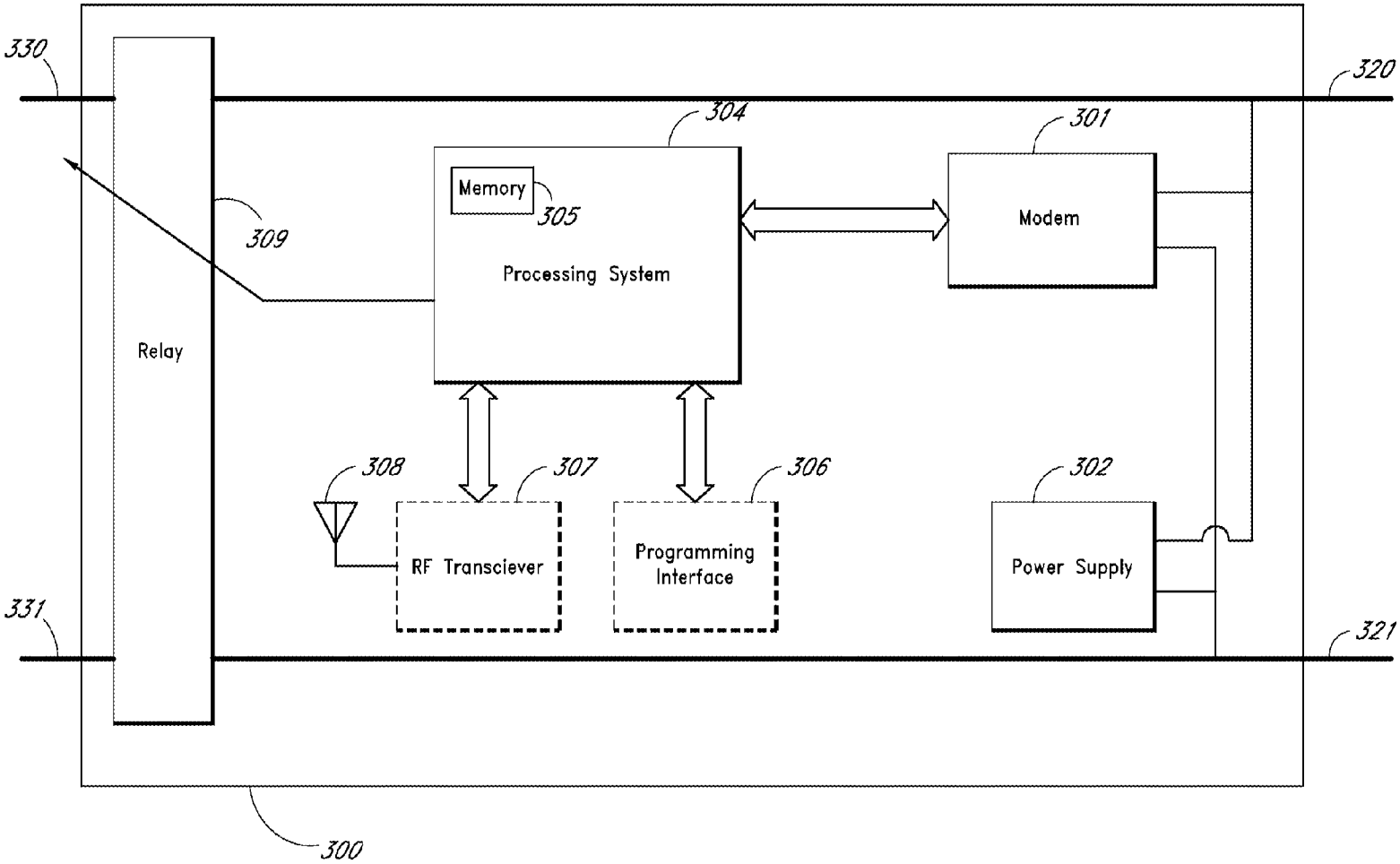
FIG. 3 shows a load-control device that controls power to a relatively high-load device.

FIG. 3 shows a load-control device 300 that controls power to a relatively high-load device. In the device 300, electrical power inputs 320, 321 are provided to a modem 301, to a power supply 302, and to a power relay 309. Data from the modem is provided to a processing system 304 that includes a memory 305. In one embodiment, the memory 305 is a non-volatile memory. An optional programming interface 306 (also known as a data interface) is provided to the processing system 304. An optional Radio Frequency (RF) transceiver 307 (having an antenna 308) is provided to the processing system 304. The modem 301, the programming interface 306, and the transceiver 307 provide data interfaces to the processing system 304.

Although referred to herein as a transceiver, when one-way communication is desired, the transceiver 307 can be configured as a receiver for a receive-only system, or a transmitter for a transmit-only system. When configured as a receive-only system, the transceiver 307 can be used to receive instructions from the power authority. When configured as a transmit-only system, the transceiver 307 can be used to send data and/or status information to the power authority. When configured as a transmit/receive system for two-way communication, the transceiver 307 can be used to receive instructions from the power authority and to send data and/or status information to the power authority.

A control output from the processing system 304 is provided to a control input of the power relay 309. In one embodiment, the power relay 309 includes a solid-state relay. In one embodiment, the power relay 309 includes a solid-state relay using high-power solid state devices (e.g., triacs, Insulated Gate Bipolar Transistors, Power MOSFETS, etc.). In one embodiment, the power relay 309 includes a mechanical relay. In one embodiment, the power relay 309 is part of a circuit-breaker mechanism that allows the circuit breaker to be switched on and off electrically. In one embodiment, the relay 309 is configured as a double-pole relay that switches the connection between the input terminal 320 and the output terminal 330 as well as the connection between the input terminal 321 and the output terminal 331. In one embodiment, the input terminal 321 is provided to the output terminal 331 and the relay 309 is configured as a single-pole relay that switches the connection between the input terminal 320 and the output terminal 330. In one embodiment, the load-control device is configured as a replacement for a double-pole circuit breaker.

In one embodiment, the modem 301 facilitates one-way communication to allow the processing system 304 to receive instructions and/or data from the injector 201 or other power line communication device. In one embodiment, the modem 301 facilitates two-way communication, to allow the processing system 304 to receive instructions and/or data from the injector 201 or other power line communication device and to send data to the injector 201 or to other power line communication devices.

The optional programming interface 306 can be configured as a computer port, such as, for example, a Universal Serial Bus (USB) port, a firewire port, an Ethernet port, a serial port, etc. In one embodiment, connection to the programming interface is 306 is provided by an external connector. In one embodiment, connection to the programming interface is provided by a magnetic coupling, a capacitive coupling, and/or an optical coupling (e.g., an InfraRed (IR) coupling, a visible light coupling, a fiber optic connector, a visible light coupling, etc.). The optional programming interface 306 can be configured to provide program code, identification codes, configuration codes, etc., to the programming system 304 and/or to read data (e.g., programming code, identification codes, configuration data, diagnostic data, log file data, etc.) from the programming system 304.

The optional RF transceiver 307 can be configured to provide communication with the processing system 304 through standard wireless computer networking systems, such as, for example, IEEE802.11, bluetooth, etc. The optional RF transceiver 307 can be configured to provide communication with the processing system 304 through proprietary wireless protocols using frequencies in the HF, UHF, VHF, and/or microwave bands. The optional RF transceiver 307 can be configured to provide communication using cellular telephone systems, pager systems, on subcarriers of FM or AM radio stations, satellite communications, etc., with the processing system 304 through proprietary wireless protocols using frequencies in the HF, UHF, VHF, and/or microwave bands. In one embodiment, the antenna 308 is electromagnetically coupled to one or more electric circuit wires (such as, for example, the power input lines 320 or 321, or other nearby electrical power circuits) so that the power circuits can operate as an antenna.

The modem 301 receives modulated power line data signals from the power inputs 320, 321, demodulates the signals, and provides the data to the processing system 304. The processing system 304 controls the relay 309 to provide power to the output lines 330, 331. The output lines 330, 331 are provided to the electrical equipment controlled by the load-control device 300.

In one embodiment, the programming system 304 uses the memory 305 to keep a log file recording commands received and/or actions taken (e.g., when the relay 309 was turned on and off, how long the relay 309, was off, etc.). In one embodiment, the programming interface 306 can be used to read the log file. In one embodiment, the log file can be read using the modem 301. In one embodiment, the log file can be read using the RF transceiver 307. In one embodiment, data from the log file can be read using an Automatic Meter Reading (AMR) system. In one embodiment, an AMR system interfaces with the processing system 304 via the modem 301, the programming interface 306 and/or the transceiver 307.

In one embodiment, fraudulent use, malfunctions, and/or bypassing of the load-control device is detected, at least in part, by reviewing the log file stored in the memory 305. The power authority knows when shutdown instructions were issued to each load-control device. By comparing the known shutdown instructions with the data in the log file, the power authority can determine whether the load-control device shut down the electrical equipment as instructed.

The load-control device 300 can be built into the relatively high-load device. The load-control device 300 can be added to a relatively high-load device as a retrofit. In one embodiment, the load-control device 300 is built into a circuit breaker, such as, for example, the double-pole circuit breakers 112-115 that provide power to a relatively high-load device.

Figure 4:
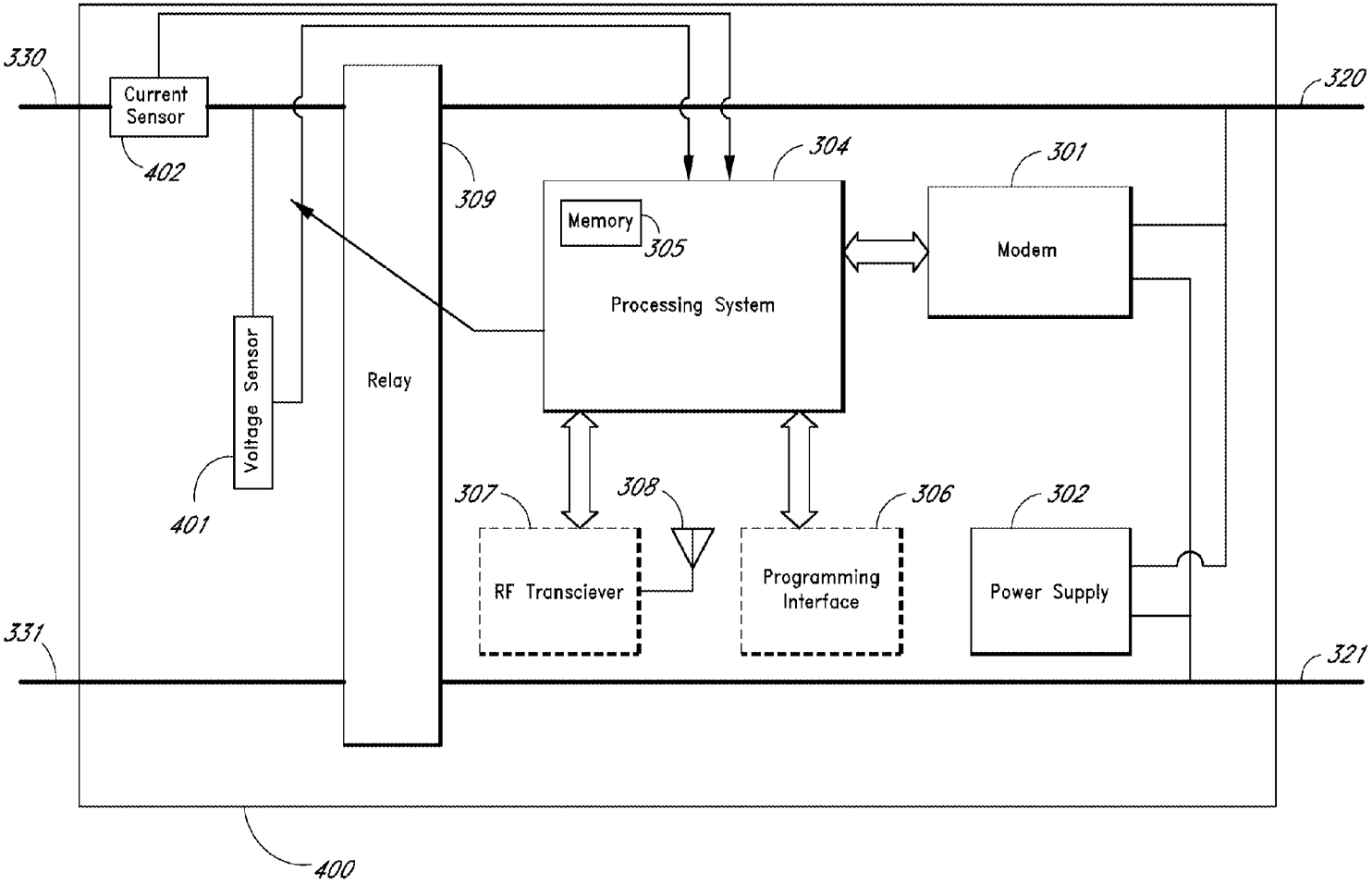
FIG. 4 shows a load-control and power-monitoring device that controls power to a relatively high-load device.

FIG. 4 shows a load-control and power monitoring device 400 that controls power to a relatively high-load device and monitors power to the device. The system 400 is similar to the system 300, and includes the electrical power inputs 320, 321, the modem 301, the power supply 302, the power relay 309, the processing system 304 and the memory 305, the optional programming interface 306, and the optional RF transceiver 307. In the system 400, a voltage sensor 401 measures the voltage provided to the terminals 330, 331 and a current sensor 402 measures the current provided to the terminal 330. The voltage and current measurements from the sensors 401, 402 are provided to the processing system 304.

The load-control and power monitoring device 400 measures voltage and current at the output terminals 330, 331. Thus, the device 400 can monitor and track the amount of power delivered to the load. In one embodiment, the device 400 keeps a log of power provided to the load in the log file stored in the memory 305.

The sensors 401, 402 are configured to measure electric power. In one embodiment, the sensor 401 measures voltage provided to a load and power is computed by using a specified impedance for the load. In one embodiment, the sensor 402 measures current provided to the load and power is computed by using a specified impedance or supply voltage for the load. In one embodiment, the sensor 401 measures voltage and the sensor 402 measures current provided to the load and power is computed by using a specified power factor for the load. In one embodiment, the sensor 401 measures voltage and the sensor 402 measures current, and power provided to the load is computed using the voltage, current, and the phase relationship between the voltage and the current.

Voltage should not occur at the output terminals 330, 331 when the relay 309 is open. Thus, in one embodiment, the device 400 detects tampering or bypassing by detecting voltage at the output terminals 330, 331 when the relay 309 is open. In one embodiment, the modem 301 provides two-way communication and the processing system 304 sends a message to the power authority when tampering or bypassing is detected.

Similarly, the current sensor 402 should detect current from time to time when the relay 309 is closed (assuming the electrical equipment provided to the output terminals 330, 331 is operational). Thus, in one embodiment, the device 400 detects the possibility of tampering or bypassing by sensing that current has been delivered to the attached equipment on a schedule consistent with the type of attached equipment.

Figure 5:
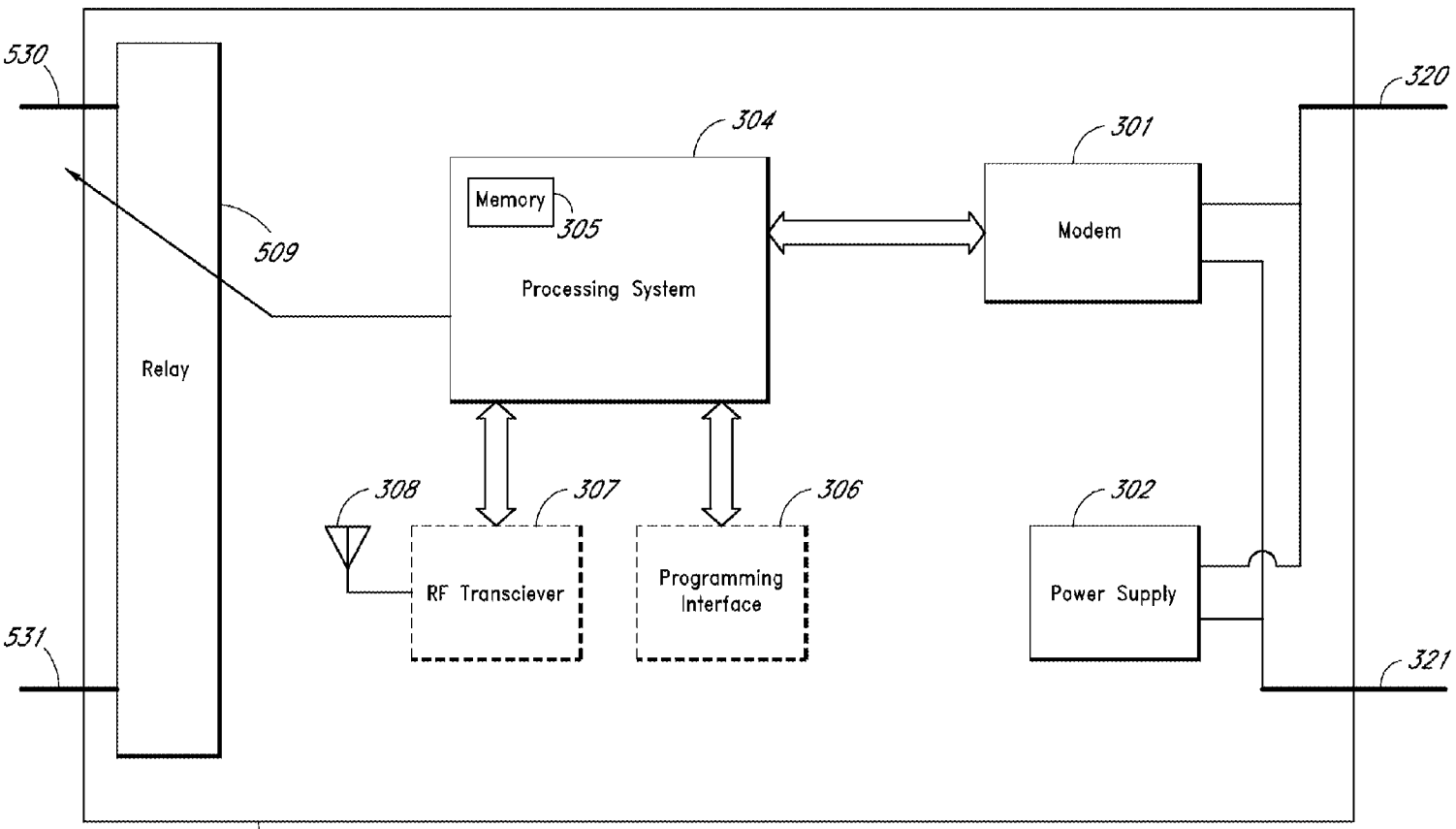
FIG. 5 shows a load-control device for controlling a relatively high-load device using relatively low power control, such as, for example, thermostat control lines.

FIG. 5 shows a load-control and power monitoring device for controlling a relatively high-load device using relatively low power control, such as, for example, thermostat control lines. The system 500 is similar to the system 300 and includes the electrical power inputs 320, 321, the modem 301, the power supply 302, the processing system 304 and the memory 305, the optional programming interface 306, and the optional RF transceiver 307. In the system 500, the power relay 309 is replaced by a relatively low-voltage relay 509. Relay outputs 530, 531 can be used in connection with low-voltage control wiring (e.g., thermostat wiring, power relay control inputs, etc.) to control operation of a relatively high-load device.

In one embodiment, the load-control device 500 (or the load-control devices 300, 400) allow the power authority to switch an electrical equipment device such as an air-conditioner into a low-power mode. For example, many higher-quality building air-conditioner systems have one or more low-power modes where the compressor is run at a lower speed. Thus, in one embodiment, the power authority can use the load-control device 500 to place the controlled electrical equipment in a low-power mode or into a shut-down mode. In one embodiment, a plurality of relays 509 is provided to allow greater control over the controlled device. Thus, for example, in one embodiment a first relay 509 is provided to signal the controlled device to operate in a low-power mode, and a second relay 509 is provided to signal the controlled device to shut down. Alternatively, two or more load-control devices 500 can be used for a single piece of electrical equipment. In one embodiment, a first load-control device having a first identification code is provided to signal the electrical equipment to operate in a low-power mode, and a second load-control device having a second identification code is provided to signal the electrical equipment to shut down.

Figure 6:
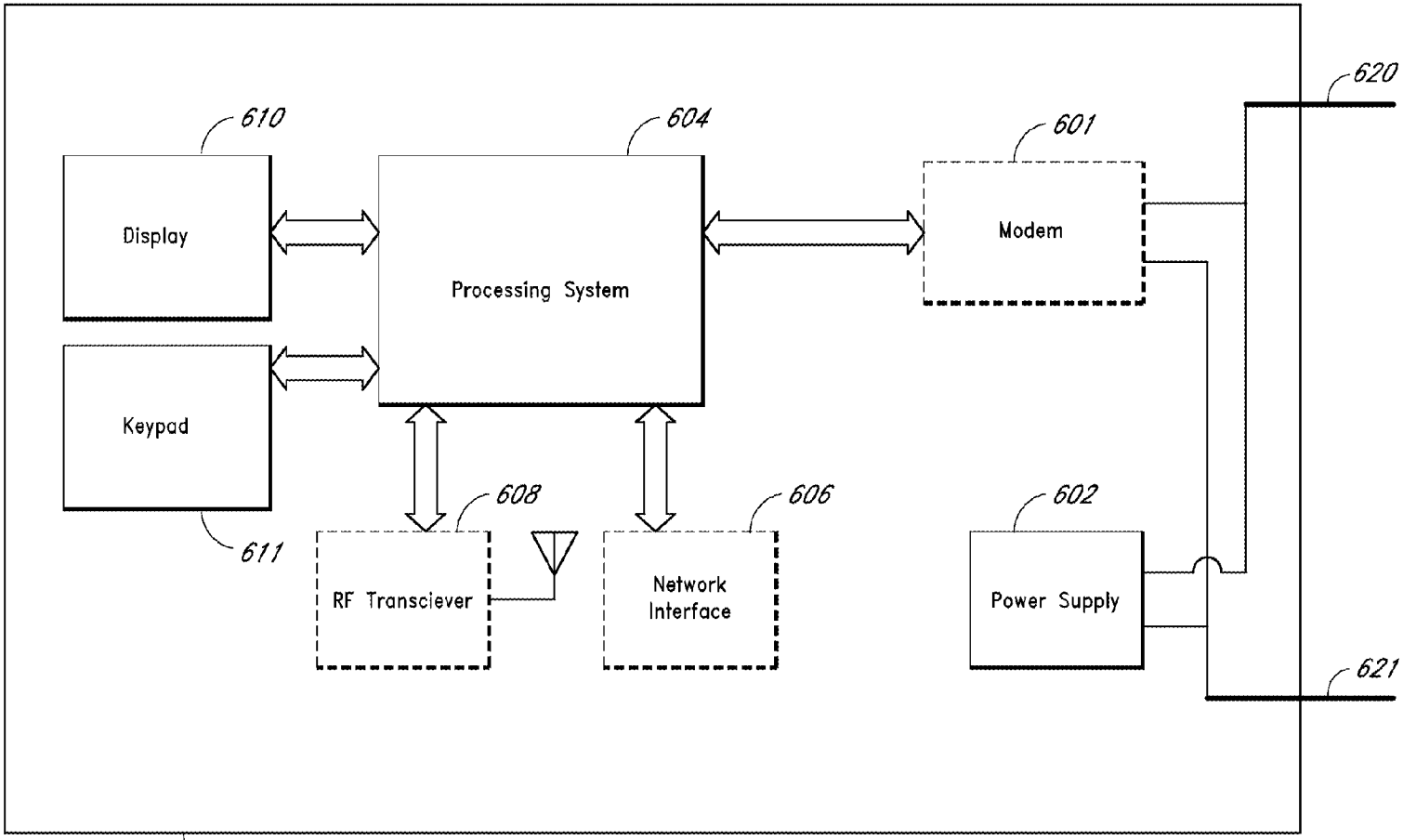
FIG. 6 shows a display system for monitoring electrical devices and/or for receiving messages from a power authority.

FIG. 6 shows a display system 600 for monitoring the load-control devices 300, 400, 500 in a home or building. In the device 600, electrical power inputs 620, 621 are provided to an optional modem 601 and to a power supply 602. Data from the modem 601 is provided to a processing system 604. An optional programming interface 606 is provided to the processing system 604. An optional Radio Frequency (RF) transceiver (having an antenna 608) is provided to the processing system 604. A display 610 and a keypad 611 are provided to the processing system 604.

In one embodiment, the system 600 can be configured as a computer interface between the load-control devices and a computer, such as a personal computer, monitoring computer, PDS, etc. In one embodiment of the display system 600, when used as an interface to a computer, the display 610 and keypad 611 can be omitted since the user can use the computer display and keyboard, mouse, etc.

In one embodiment, the modem 601 facilitates one-way communication, to allow the processing system 604 to receive instructions and/or data from the injector 201, from the load-control devices or from other power line communication devices. In one embodiment, the modem 601 facilitates two-way communication, to allow the processing system 604 to exchange instructions and/or data with the injector 201, the load-control devices or other power line communication devices.

The optional programming interface 606 can be configured as a computer port, such as, for example, a Universal Serial Bus (USB) port, a firewire port, an Ethernet port, a serial port, etc. In one embodiment, connection to the programming interface is 606 is provided by an external connector. In one embodiment, connection to the programming interface is provided by a magnetic coupling, a capacitive coupling, and/or an optical coupling (e.g., an InfraRed (IR) coupling, a visible light coupling, a fiber optic connector, a visible light coupling, etc.). The optional programming interface 606 can be configured to provide program code, identification codes, configuration codes, etc. to the programming system 604 and/or to read data (e.g., programming code, identification codes, configuration data, diagnostic data, etc.) from the programming system 604.

The optional RF transceiver 607 can be configured to provide communication with the processing system 604 through standard wireless computer networking systems, such as, for example, IEEE802.11, bluetooth, etc. The optional RF transceiver 607 can be configured to provide communication with the processing system 604 through proprietary wireless protocols using frequencies in the HF, UHF, VHF, and/or microwave bands. In one embodiment, the antenna 608 is electromagnetically coupled to one or more electric circuits wires (such as, for example, the power input lines 620 or 621, or other nearby electrical power circuits) so that the power circuits can operate as an antenna.

The modem 601 receives modulated power line data signals from the power inputs 620, 621, demodulates the signals, and provides the data to the processing system 604. The processing system displays messages on the display 610 and receives user inputs from the keypad 611. Thus, for example, the system 600 can use the display 610 to display messages from the power authority and/or messages from the load-control devices. The messages proved on the display 610 can relate to the power status of the various equipment controlled by load-control devices, such as, for example, power line load conditions, which equipment is about to be shut down, which equipment is shut down, how long equipment will be shut down, total power usage, power used by each piece of equipment, etc.

In one embodiment, the programming system 604 obtains data from the log files stored in one or more of the load-control devices. In one embodiment, the display device 600 displays log file data, summaries of log file data, and/or plots of log file data from one or more of the load-control devices.

Figure 7:
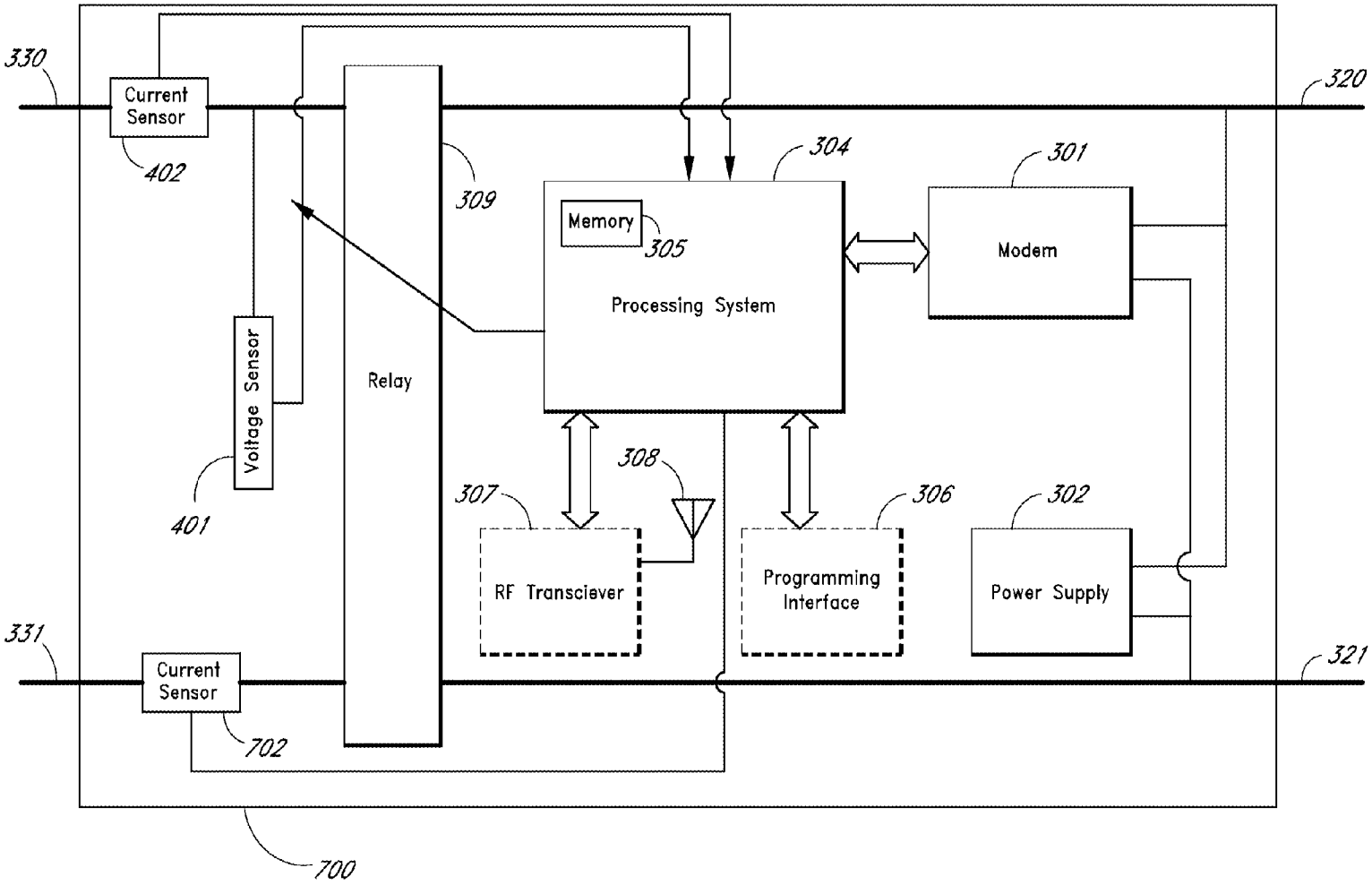
FIG. 7 shows a load-control and power-monitoring device that controls power to a relatively high-load device and monitors current on multiple phases.

FIG. 7 shows a load-control and power-monitoring device 700 that controls power to a relatively high-load device and monitors current on multiple phases. The system 700 is similar to the system 400, and includes the electrical power inputs 320, 321, the modem 301, the power supply 302, the power relay 309, the processing system 304 and the memory 305, the optional programming interface 306, the optional RF transceiver 307, and the sensors 401, 402. In the system 700, a second current sensor 702 is provided to the processor 304. The second current sensor 702 measures the current provided to the terminal 331.

Figure 8:
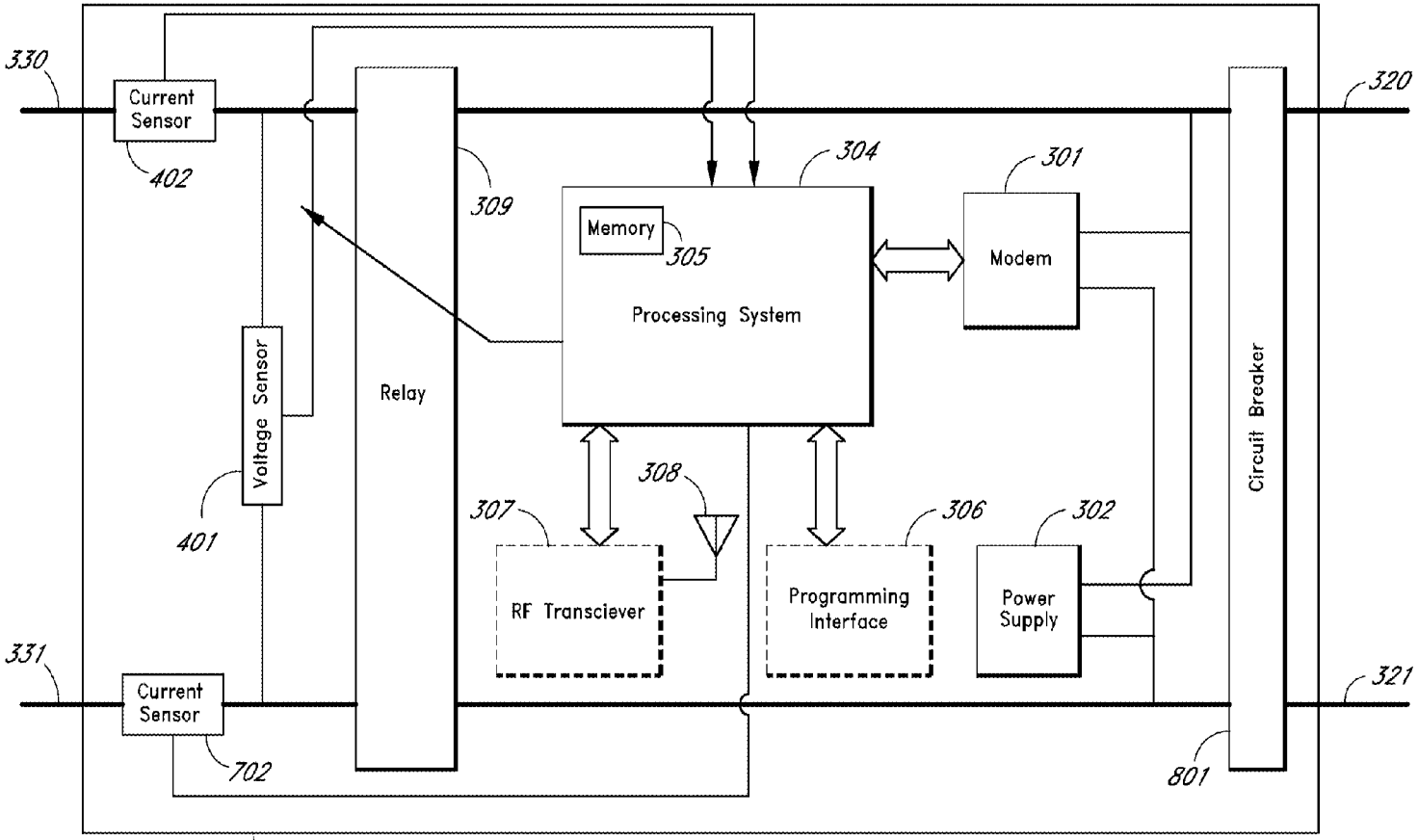
FIG. 8 shows a load-control and power-monitoring device that controls power to a relatively high-load device and provides circuit breaker overload protection.

FIG. 8 shows a load-control and power-monitoring device 800 that controls power to a relatively high-load device and provides circuit breaker overload protection. The system 800 is similar to the system 700, and includes the electrical power inputs 320, 321, the modem 301, the power supply 302, the power relay 309, the processing system 304 and the memory 305, the optional programming interface 306, the optional RF transceiver 307, and the sensors 401, 402, 702. In the system 800, the input terminals 320 and 321 are provided to a double-pole circuit breaker 801. Respective outputs of the double-pole circuit breaker 801 are provided to the modem 301, the power supply 302, and the relay 309. When the circuit breaker 801 trips, the modem 301, the power supply 302, and the relay 309 are disconnected from the electric power inputs 320, 321.

Figure 9:
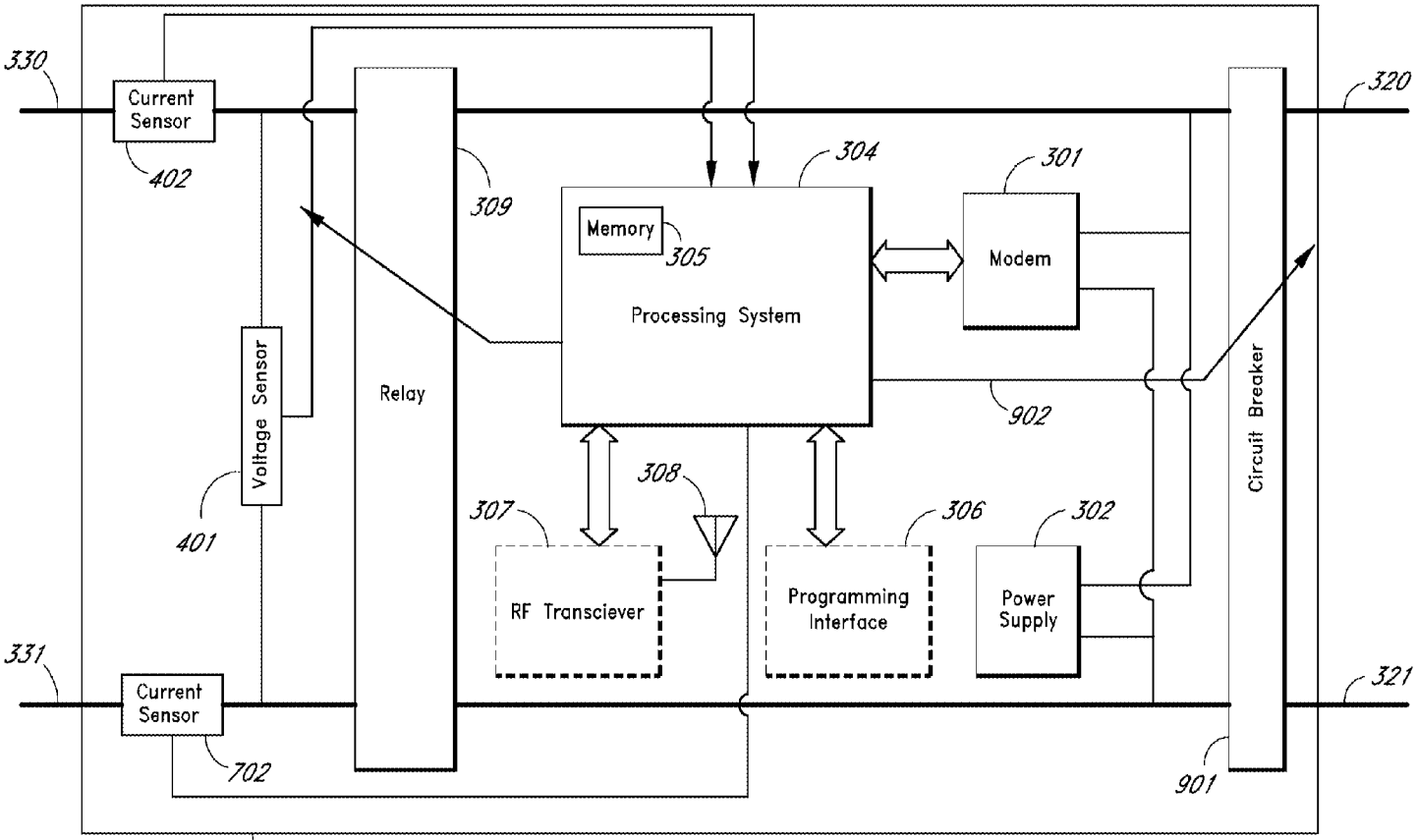
FIG. 9 shows a load-control and power-monitoring device that controls power to a relatively high-load device and provides circuit breaker overload protection with electric trip.

FIG. 9 shows a load-control and power-monitoring device 900 that controls power to a relatively high-load device and provides circuit breaker overload protection with electric trip. The system 900 is similar to the system 700, and includes the electrical power inputs 320, 321, the modem 301, the power supply 302, the power relay 309, the processing system 304 and the memory 305, the optional programming interface 306, the optional RF transceiver 307, and the sensors 401, 402, 702. In the system 900, the input terminals 320 and 321 are provided to a double-pole circuit breaker 801. Respective outputs of the double-pole circuit breaker 901 are provided to the modem 301, the power supply 302, and the relay 309. When the circuit breaker 901 trips, the modem 301, the power supply 302, and the relay 309 are disconnected from the electric power inputs 320, 321. The circuit breaker 901 trips due to current overload in typical circuit-breaker fashion. In addition, an electric trip output from the processing system 304 is provided to an electric trip input of the circuit breaker 901 to allow the processing to tip the breaker 901. In one embodiment, the processing system 304 trips the breaker 901 when an over-current condition is detected by one or more of the current sensors 402, 702. In one embodiment, the processing system 304 trips the breaker 901 when a fault condition is detected. In one embodiment, the processing system 304 trips the breaker 901 when a ground-fault condition is detected. In one embodiment, the processing system 304 trips the breaker 901 when tampering is detected. In one embodiment, the processing system 304 trips the breaker 901 when an over-voltage condition is detected by the voltage sensor 401. In one embodiment, the processing system 304 trips the breaker 901 when a trip command is received via the modem 301. In one embodiment, the processing system 304 trips the breaker 901 when a trip command is received via the programming interface 306. In one embodiment, the processing system 304 trips the breaker 901 when a trip command is received via the RF transceiver 307. In one embodiment, the processing system 304 trips the breaker 901 when a fault is detected in the relay 309 (for example, the voltage sensor 401 can be used to detect when the relay 309 fails to open or close as instructed by the processing system 305).

Figure 10:
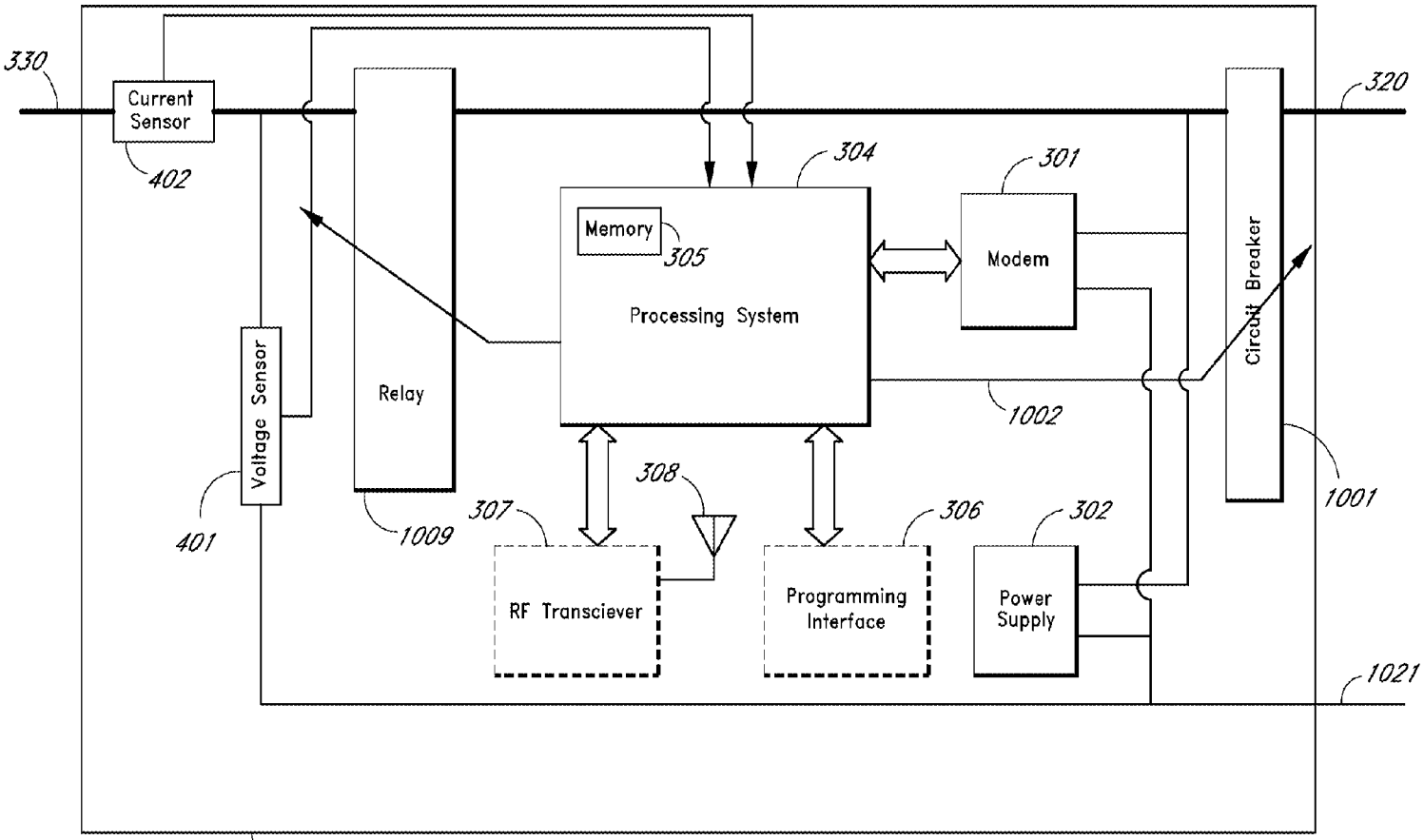
FIG. 10 shows a single-phase load-control and power-monitoring device that controls power to a relatively high-load device.

FIG. 10 shows a single-phase load-control and power-monitoring device 1000 that controls power to a relatively high-load device. The single-phase device 1000 is similar to the device 900 except that the relay 309 is replaced by a single-phase relay 1009, the double-phase breaker 901 is replaced by a single-phase breaker 1001. The input 320 is provided to the single-phase breaker 1001. A neutral line input 1021 and the single-phase output from the breaker 1001 are provided to the modem 301 and the power supply 302. The single-phase output from the breaker 1001 is provided to the single-phase relay 1009.

In one embodiment, the processing system 304 is provided with an identification code. In one embodiment, the identification code identifies the controlled electrical equipment provide to the terminals 330, 331 (or 530,531) and thus, allows the load-control devices 250 to be addressed so that multiple pieces of electrical equipment can be controlled by providing one or more load-control devices to control each piece of electrical equipment. In one embodiment, the identification code is fixed. In one embodiment, the identification code is programmable according to commands received through the modem 301. In one embodiment, the identification code is programmable according to commands received through the programming interface 306. In one embodiment, the identification code is programmable according to commands received through the RF transceiver 307.

In one embodiment, the identification code used by the processing system 304 includes a device-type that identifies the type of equipment provided to the output terminals 330, 331 (or 530, 531). Thus, for example, in one embodiment the device-type specifies a type of device, such as, for example, a pool filter pump, an electric oven, an electric range, an electric water heater, a refrigerator, a freezer, a window air-conditioner, a building air-conditioner, etc. Relatively low-priority devices such as pool filter pumps can be shut down by the power authority for relatively long periods of time without harmful impact. Power overloads usually occur during the afternoon when temperatures are highest. Pool filter pumps can be run at night when temperatures are cooler and there is less stress on the power system. Thus, in one embodiment, the power authority can instruct the load-control devices having a device-type corresponding to a pool filter pump to shut down for relatively many hours, especially during the daytime.

In one embodiment, the identification code includes a region code that identifies a geographical region. In one embodiment, the identification code includes an area code that identifies a geographical area. In one embodiment, the identification code includes one or more substation codes that identify the substations that serve power to the processing system 304. In one embodiment, the identification code includes one or more transformer codes that identify the transformers that serve power to the processing system 304.

Other relatively high-load devices, such as, for example, electric ovens, electric ranges, and/or electric water heaters, are perhaps more important than pool filter pumps, but relatively less important than air conditioners during the hottest part of the day (when power loads tend to be highest). Thus, if shutting down pool filter pumps does not sufficiently reduce power usage, the power authority can then instruct the load-control devices having a device-type corresponding to such devices to shut down for extended periods of time, especially during the hottest part of the day, in order to reduce power usage. Such equipment can be shut down on a rolling basis over relatively limited areas or over a wide area. The shutdown of such equipment is perhaps more inconvenient than shutting down a pool filter pump, but less inconvenient than shutting down air-conditioners or refrigerators.

If, after shutting down less important equipment, the power system is still overloaded, the power authority can proceed to shut down relatively more important equipment, such as building air-conditioners, window air-conditioners, etc. Such relatively important equipment can be shut down for limited periods of time on a rolling basis in order to limit the impact.

In one embodiment, the system sensors 402, 702 and/or the voltage sensor 401 to measure and track the power provided to the attached device. The processing system 304 uses the sensor data to calculate system efficiency, identify potential performance problems, calculate energy usage, etc. In one embodiment, the processing system 304 calculates energy usage and energy costs due to inefficient operation. In one embodiment, the processing system 304 provides plots or charts of energy usage and costs. In one embodiment, the processing system 304 provides plots or charts of the additional energy costs due to inefficient operation of the attached electrical device.

In one embodiment, the processing system 304 monitors the amount of time that the controlled electrical equipment has been running (e.g., the amount of runtime during the last day, week, etc.), and/or the amount of electrical power used by the controlled electrical equipment. In one embodiment, the power authority can query the processing system 304 to obtain data regarding the operation of the controlled equipment. The power authority can use the query data to make load balancing decisions. Thus, for example the decision regarding whether to instruct the controlled equipment to shut down or go into a low power mode can be based on the amount of time the system has been running, the home or building owner's willingness to pay premium rates during load shedding periods, the amount of power consumed, etc. Thus, for example a homeowner who has a low-efficiency system that is heavily used or who has indicated an unwillingness to pay premium rates, would have his/her equipment shut off before that of a homeowner who has installed a high-efficiency system that is used relatively little, and who had indicated a willingness to pay premium rates. In one embodiment, in making the decision to shut off the controlled equipment, the power authority would take into consideration the relative importance of the controlled equipment, amount of time the controlled equipment has been used, the amount of power consumed by the controlled equipment, etc. In one embodiment, higher-efficiency systems are preferred over lower-efficiency systems (that is, higher-efficiency systems are less likely to be shut off during a power emergency), and lightly-used systems are preferred over heavily-used systems (that is, lightly-used systems are less likely to be shut off during a power emergency).

In one embodiment, the power authority knows the identification codes or addresses of the load-control devices and correlates the identification codes with a database to determine whether the load-control device is serving a relatively high priority client such as, for example, a hospital, the home of an elderly or invalid person, etc. In such circumstances, the power authority can provide relatively less cutback in power provided.

In one embodiment, the power authority can communicate with the load-control devices to turn off the controlled equipment. The power authority can thus rotate the on and off times of electrical equipment across a region to reduce the power load without implementing rolling blackouts. In one embodiment, the load-control device is configured as a retrofit device that can be installed in a condenser unit to provide remote shutdown. In one embodiment, the load-control device is configured as a retrofit device that can be installed in a condenser unit to remotely switch the condenser-unit to a low power (e.g., energy conservation) mode. In one embodiment, the load-control device is configured as a retrofit device that can be installed in an evaporator unit to provide remote shutdown or to remotely switch the system to a lower power mode. In one embodiment, the power authority sends separate shutdown and restart commands to one or more load-control devices. In one embodiment, the power authority sends commands to the load-control devices to shutdown for a specified period of time (e.g., 10 min, 30 min, 1 hour, etc.) after which the system automatically restarts. In one embodiment, the specified period of time is randomized by the processor 304 to minimize power surges when equipment restarts. In one embodiment, the specified period of time is randomized according to a percentage (e.g., 5% randomization, 10% randomization, etc.)

Figure 11:
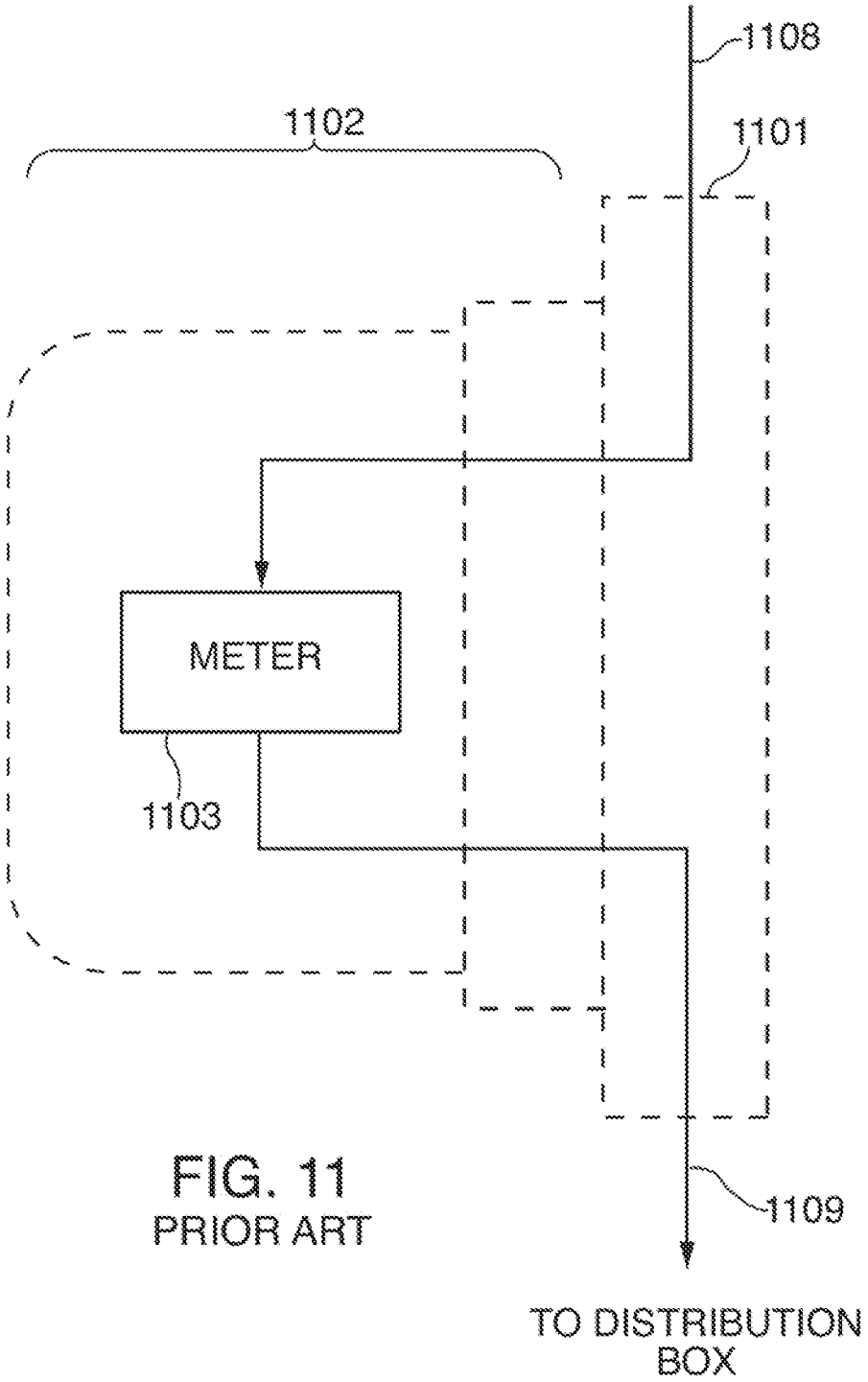
FIG. 11 PRIOR ART
FIG. 11 shows a conventional power meter.

FIG. 11 shows a conventional power meter assembly 1102 that plugs into a meter box 1101 to provide electric service to a home or building. Electric power from the power local power company is provided on an input line 1108 to the meter box 1101. An output line 1109 provides power from the power meter to the distribution box 103. The power meter 1102 includes a conventional electric power meter 1103 used by the local power company to measure power provided to the home or building for billing purposes. When the power meter assembly 1102 is plugged into the meter box 1101, the input 1108 is provided to the power meter 1103, and an output of the power meter 1103 is provided to the output 1109. The power meter 1103 typically includes a series of dials that display the amount of electric power delivered through the meter 1103. In some localities, the power meter 1103 must be read manually. In some localities, the power meter 1103 is configured to be read remotely using an Automatic Meter Reading (AMR) system.

Figure 12:
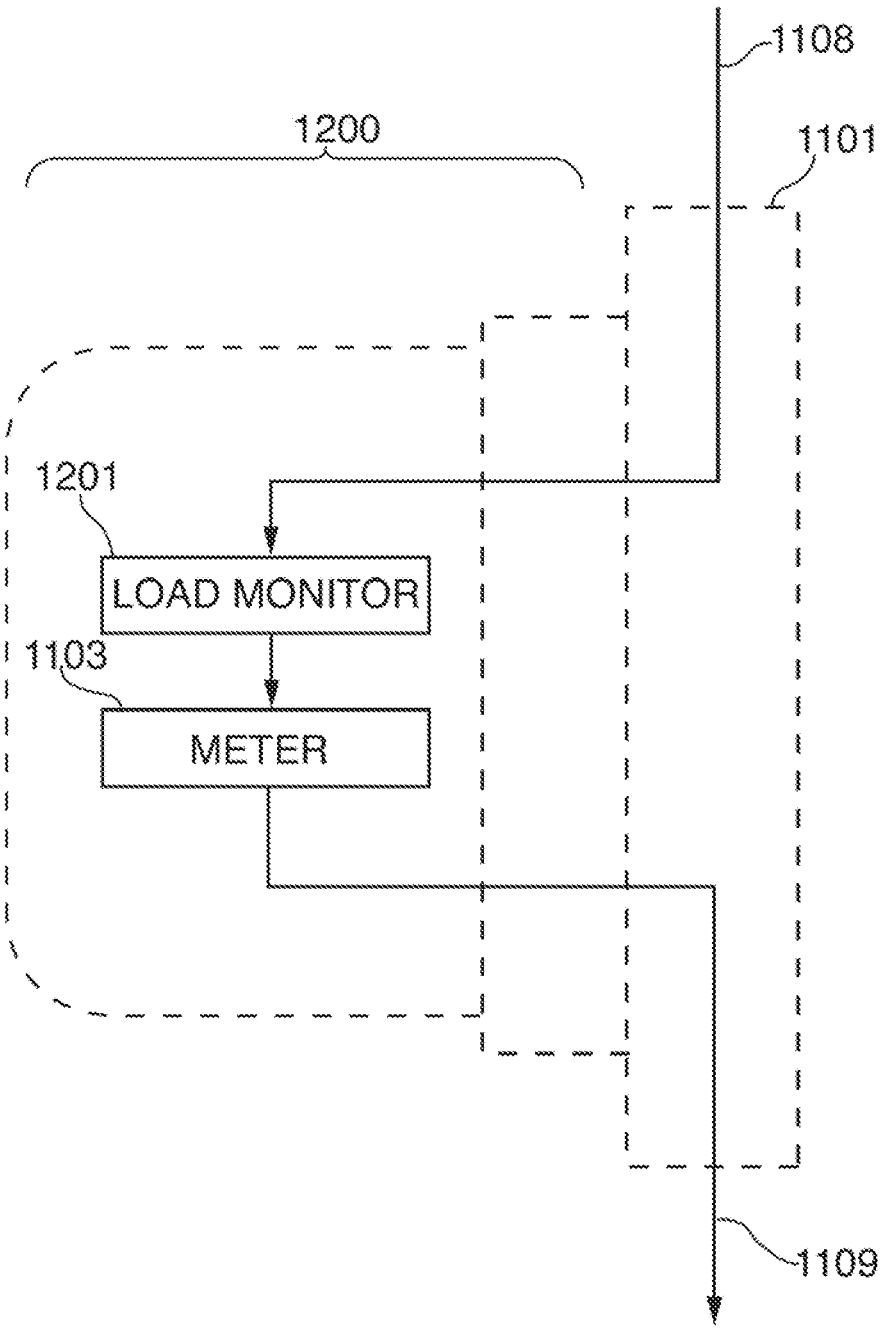
FIG. 12 shows a power meter with load control capability.

FIG. 12 shows a power meter assembly 1200 with load control capability. The power meter 1200 is configured to plug into the conventional meter box 1101. In the power meter 1200, the input 1108 is provided to a load monitor 1201. An output from the load monitor 1201 is provided to the power meter 1103. The output of the power meter 1103 is provided to the output 1109. One of ordinary skill in the art will recognize that the load monitor 1201 and the meter 1103 can be reversed such that the input 1108 is provided to the power meter 1103, the output from the power meter 1103 is provided to the load monitor 1201, and the output from the load monitor 1201 is provided 1201 is provided to the output 1109. The load monitor 1201 can also be provided inside the meter box 1201 or the box housing the distribution panel 103.

Figure 13:
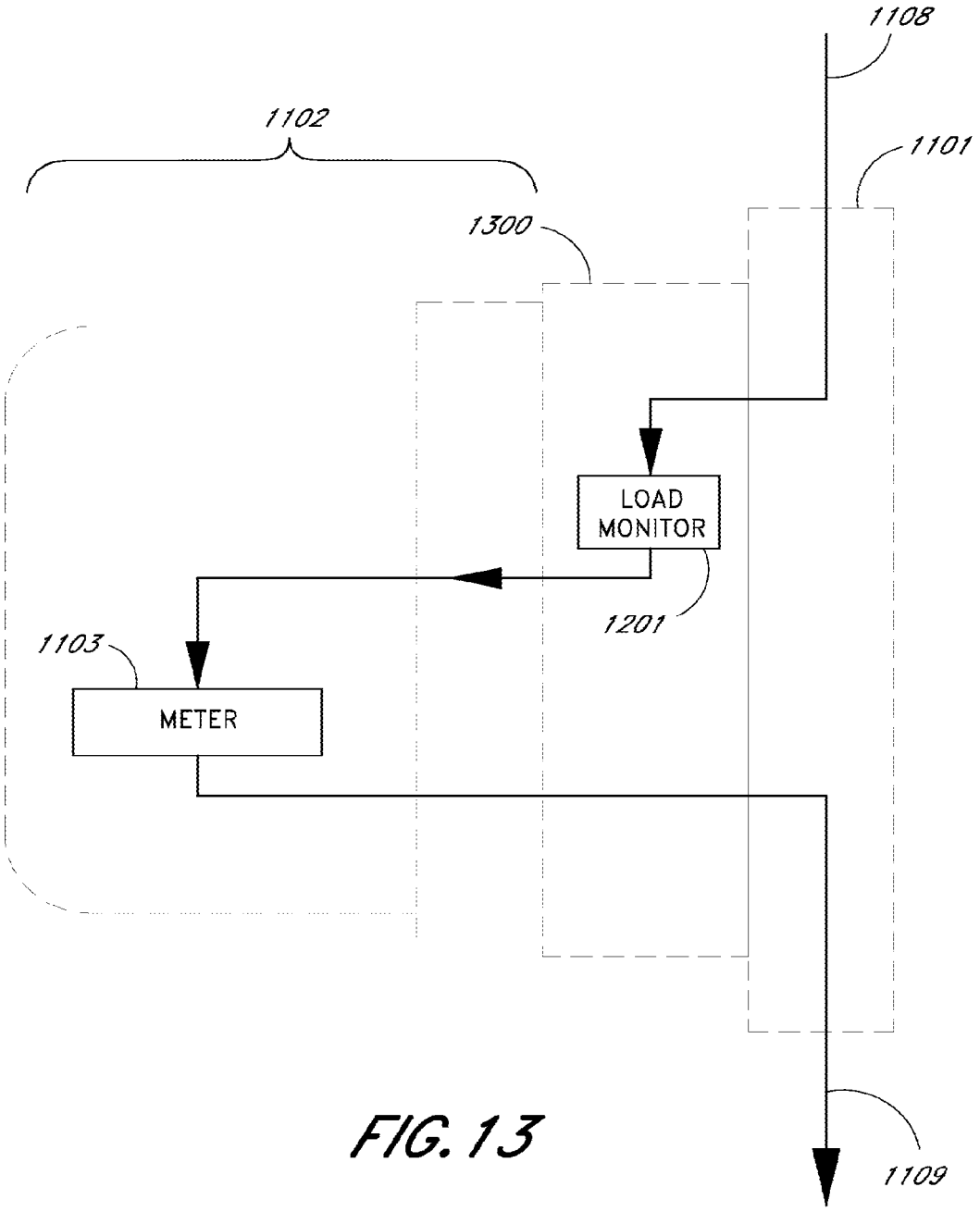
FIG. 13 shows a load control module for use in connection with a standard power meter.

FIG. 13 shows a load control assembly 1300 for use in connection with a standard power meter assembly 1102. The load control assembly 1300 is configured to plug into the conventional power meter box 1101. The load control assembly 1300 provides a conventional receptacle such that the standard power meter assembly 1102 can then be plugged into the load control assembly 1300. In the load control assembly, the input 1108 is provided to the load monitor 1201. An output from the load monitor 1201 is provided to the power meter assembly 1102. The output of the power meter assembly 1102 is provide, via the assembly 1300, to the output 1109. One or ordinary skill in the art will recognize that the load monitor 1201 and the meter 1103 can be reversed such that the input 1108 is provided, via the assembly 1300, to the power meter 1103, the output from the power meter 1103 is provided to the load monitor 1201, and the output from the load monitor 1201 is provided 1201 is provided to the output 1109.

The load monitor 1201 provides load control and monitoring as described in connection with FIGS. 3-5 and/or 7-10. In one embodiment, the power authority sends instructions to the load monitor 1201 using power line networking via the modem 301. In one embodiment, the power authority sends instructions to the load monitor 1201 using power line networking via programming interface 306 (e.g., through a wired network connection, telephone connection, cable connection, fiber-optic connection, etc.). In one embodiment, the power authority sends instructions to the load monitor 1201 using wireless transmission via the transceiver 307.

In one embodiment, the load monitor 1201 is provided in the distribution box 103 in series with the master breaker 104. In one embodiment, the load monitor 1201 is provided to the master breaker 104. In one embodiment, the load monitor 1201 is built into the master breaker 104.

In one embodiment, the load monitor 1201 is configured as shown in FIGS. 4 and/or 7-10 and programmed to operate such that the power authority can command the processor 304 to allow no more than a specified maximum amount of power (or current) is delivered through the load monitor 1201. Thus, for example, even if the power meter 102 and master breaker 104 are configured for 200 amp service (as is typical of many residential installations), then during a power shortage, the power authority can instruct the load monitor to open the relay 309 (and thus blackout the home or building served by the load monitor 1201) if the current exceeds a specified maximum (e.g., 20 amps, 30 amps, 50 amps, 100 amps, etc.), during some period of time. In one embodiment, the load monitor 1201 restores power service after a specified period of time. In one embodiment, the load monitor 1201 restores power service after the power authority sends instructions or commands to the load monitor 1201 informing the load monitor 1201 that more power is available. In one embodiment, after receiving commands to reduce power, the load monitor 1201 delays transitioning to low-power mode for a period of time in order to give downstream load control devices, such as the load-control devices 250, time to reduce the power load. In one embodiment, after receiving commands to reduce power, the load monitor 1201 delays transitioning to low-power mode for a period of time in order to give the home or building owner time to reduce the power load.

Thus, the load monitor 1201 provided in the service line can be used with or without the load control devices 250 provided with specified circuits (or loads) in the home or building to provide load control. The load monitor 1201 and/or load control devices 205 can be used on a voluntary basis, in connection with a regulatory scheme, or some combination thereof. For example, a regulatory scheme can be adopted that requires load control devices 250 in certain relatively high-load circuits (e.g., pool filter pumps, electric water heaters, electric ovens, air-conditioners, etc.).

Alternatively, a regulatory scheme can be adopted that requires the load control device 1201 be installed at the service entrance while leaving it up to the homeowner or building owner to voluntarily install the load control devices 250 in various circuits. Under such a regulatory scheme, a home owner that does not install load control devices 250 in the relatively high-load circuits of the home or building runs the risk of losing service during a power shortage because the load control device 1201 will act like a circuit breaker and "trip" if the owner tries to draw more power than the power authority has authorized during the power shortage. Unlike a regular circuit breaker, in such a regulatory scheme, the load control monitor 1201 can be configured so that it cannot be immediately reset and thus the owner will have to endure a blackout period. Thus, under such a regulatory scheme, it is in the owner's best interests to voluntarily install the load control devices 250 so that the total load through the load monitor device 1201 is less than the allowed load during the power shortage.

In one embodiment, the load monitor device 1201 uses the modem 301, the programming interface 306 and/or the RF transceiver 307 to send status and/or shutdown messages to the load control devices 250 and/or the display device 600. A load control system based on the load monitor device 1201, the load control devices 205, and the display device 600 (or computer) is flexible and can be configured to operate in different ways.

In one embodiment, the load monitor device 1201 receives a load-limit message from the power authority instructing the load monitor device 1201 to limit power or current drawn through the building's electrical service. The load monitor device 1201 then selects the circuits to shut down (based on the allowed current) and sends shutdown commands to the various load control devices 250. In one embodiment, the display system 600 (or computer) also receives the shutdown commands and can format a display showing which devices have been shut down. In one embodiment, the load monitor device 1201 sends one or more status messages to the display system 600 (or computer) to allow the display system 600 inform the owner of the power status (e.g., which devices have been shut down, how long the shutdowns will last, how much power is allowed, etc.)

In one embodiment, the load monitor device 1201 receives a load-limit message from the power authority instructing the load monitor device 1201 to limit power or current drawn through the building's electrical service. The load monitor device 1201 then sends a message to the display system 600 (or computer) informing the display system of the power restriction. The display system 600 (or computer) selects the circuits to shut down (based on the allowed current) and sends shutdown commands to the various load control devices 250. The display system 600 (or computer) formats a display to inform the owner of the power status (e.g., which devices have been shut down, how long the shutdowns will last, how much power is allowed, etc.). In one embodiment, the owner can use the display system 600 (or computer) to select which devices will be shut down and which devices will remain operational. Thus, for example, during an extended power outage, the owner can rotate through the relatively high-load devices first using the air-conditioner (with the hot-water heater shut down) and then using the hot-water heater (with the air-conditioner shut down). The owner can also use the display system 600 (or computer) to establish power priorities and determine the order in which circuits are shut down based on the available power. Thus, for example, in winter, the homeowner can choose to shut down all circuits except the electric heater (or heat pump), while in summer the same homeowner might decide to shut down the air-conditioner before shutting down the electric water heater. Thus, in one embodiment, when the total power is limited by the load monitor device 1201, the homeowner (or building owner) can use the display system 600 (or computer) to make decisions regarding which devices are shut down and in what order. In one embodiment, the display system 600 (or computer) knows the power (or current) drawn by each piece of electrical equipment serviced by a load-control device 250 and thus the display system 600 (or computer) can shut down the required number of devices based on the priorities established by the user (or based on default priorities).

In one embodiment, a regulatory scheme requires load-control devices 250 for all relatively high-load devices in a home or building. In one embodiment, the power authority shuts down the relatively high-load equipment based one a priority schedule (e.g., pool filter pumps first, then ovens and stoves, then electric water heaters, then air-conditioners, then heaters, etc.) until the system load has been sufficiently reduced. In one embodiment, the power authority shuts down the relatively high-load equipment based on location (e.g., first one neighborhood, then another neighborhood) in a rolling fashion until the system load has been sufficiently reduced. In one embodiment, the priority schedule is established by the power authority. In one embodiment, the priority schedule is established by the home or building owner.

In one embodiment, the priority schedule is adaptive such that a group of load control devices 205 negotiate to determine the priority. In one embodiment, heating devices have a relatively higher priority in winter (e.g., less likely to be turned off) and a relatively lower priority in summer.

In one embodiment, a regulatory scheme requires both load monitoring devices 1201 and load-control devices 250.

In one embodiment, the processing system is configured to support encrypted communication through the modem 301, the programming interface 306, and/or the RF transceiver 307 to prevent unauthorized access. In one embodiment, a first encryption is used for communication with the processing system 304 related to load reduction commands such that only the power authority has the ability to send load reduction commands to the processing system 304. In one embodiment, a second encryption is used for communication with the processing system 304 related to status and power usage information so that the home or building owner can use the display system 600 and/or a computer to make inquiries to the processing system 304 regarding power usage, power status, etc. Using two different encryptions allows the power authority to control the processing system 304 to reduce loads on the power system, while still allowing the home or building owner to make inquiries to the processing system 304 (while preventing neighbors and other unauthorized persons to access the system 304).

In one embodiment, the first and second encryptions are provided by using first and second passwords. In one embodiment, the first and second encryptions are provided by using first and second encryption methods.

In one embodiment, encrypted access is provided via one communication method (e.g., through a selected frequency band or bands via modem 301, through one or more access methods provided by the programming interface 306, and/or through a selected frequency band or bands via the transceiver 307). Thus, by way of example, and not by way of limitation, in one embodiment, the processor 304 can be configured such that commands from the power authority are received via the RF transceiver 307, communication with the display system 600 or computer are provided by the modem 301, and configuration of the processing system 304 (e.g., entry of passwords) is provided by communication using the programming interface 306.

In one embodiment, the relay 309 is configured such that when the relay 309 is open, power line networking signals from the modem 301 are still provided to the output terminals 330, 331. In one embodiment, the relay 309 includes a high-pass filter to allow powerline-networking signals from the modem 301 to flow through the relay when the relay is open. In one embodiment, the relay 309 includes a band-pass filter to allow powerline-networking signals from the modem 301 to flow through the relay when the relay is open.

In one embodiment, the circuit breakers 801, 901 are configured such that when the breaker 801, 901 is tripped (open), power line networking signals from the modem 301 are still provided to the input terminals 320, 321. In one embodiment, circuit breakers 801, 901 are bypassed by a high-pass filter to allow powerline-networking to flow through the breaker when the breaker is open. In one embodiment, the circuit breakers 801, 901 include a band-pass filter to allow powerline-networking to flow through the breaker when the breaker is open.

In addition to providing load control for the power authority, the systems described herein can be used for load control by the home or building owner to track power usage and reduce power costs. Thus, for example, when the load monitor device 1201 is configured using embodiments that include the current sensors 402, 702, the load monitor device 1201 can provide current usage (and thus, power usage) data to the display system 600 (or computer). When the load-control devices 250 are configured using embodiments that include the current sensors 402 and/or 702, the load-control devices 250 can provide current usage (and thus, power usage) data to the display system 600 (or computer) for the electrical equipment serviced by the load-control device. 250.

In one embodiment, the modem 301 is configured to operate in a plurality of powerline networking modes such as, for example, BPL, X10, LonWorks, current carrier, etc. In one embodiment, the modem 301 communicates with the power authority using a first power line networking protocol, and the modem 301 communicates with the display 600 or computer using a second power line networking protocol.

In one embodiment, the modem 301 is omitted. In one embodiment, the transceiver 307 is omitted. In one embodiment, the programming interface 306 is omitted.

In one embodiment, the relay 309 is configured to close in a manner that provides a "soft" restart of the electrical equipment in order to reduce surges on the power line. In one embodiment, the relay 309 is configured as a solid state relay and the processing system 304 controls the solid state relay in a manner that provides a soft restart. In one embodiment, the relay 309 is configured as a solid state relay and the processing system 304 controls the solid state relay in a manner that provides a soft restart by progressively switching cycles of the AC power on the power line.

In one embodiment, the relay 309 is configured to close in a manner that provides a dimmer-like function such that resistive electrical equipment, such as, for example, electric water heaters, electric ovens and ranges, resistive electric heaters, and the like can be controlled at reduced power levels without being shut completely off. In one embodiment, the relay 309 is configured as a solid state relay and the processing system 304 controls the solid state relay in a manner that provides a dimmer-like function. In one embodiment, the relay 309 is configured as a solid state relay and the processing system 304 controls the solid state relay in a manner that provides a dimmer-like function by progressively switching selected cycles, or portions of cycles, of the AC power on the power line.

Figure 14:
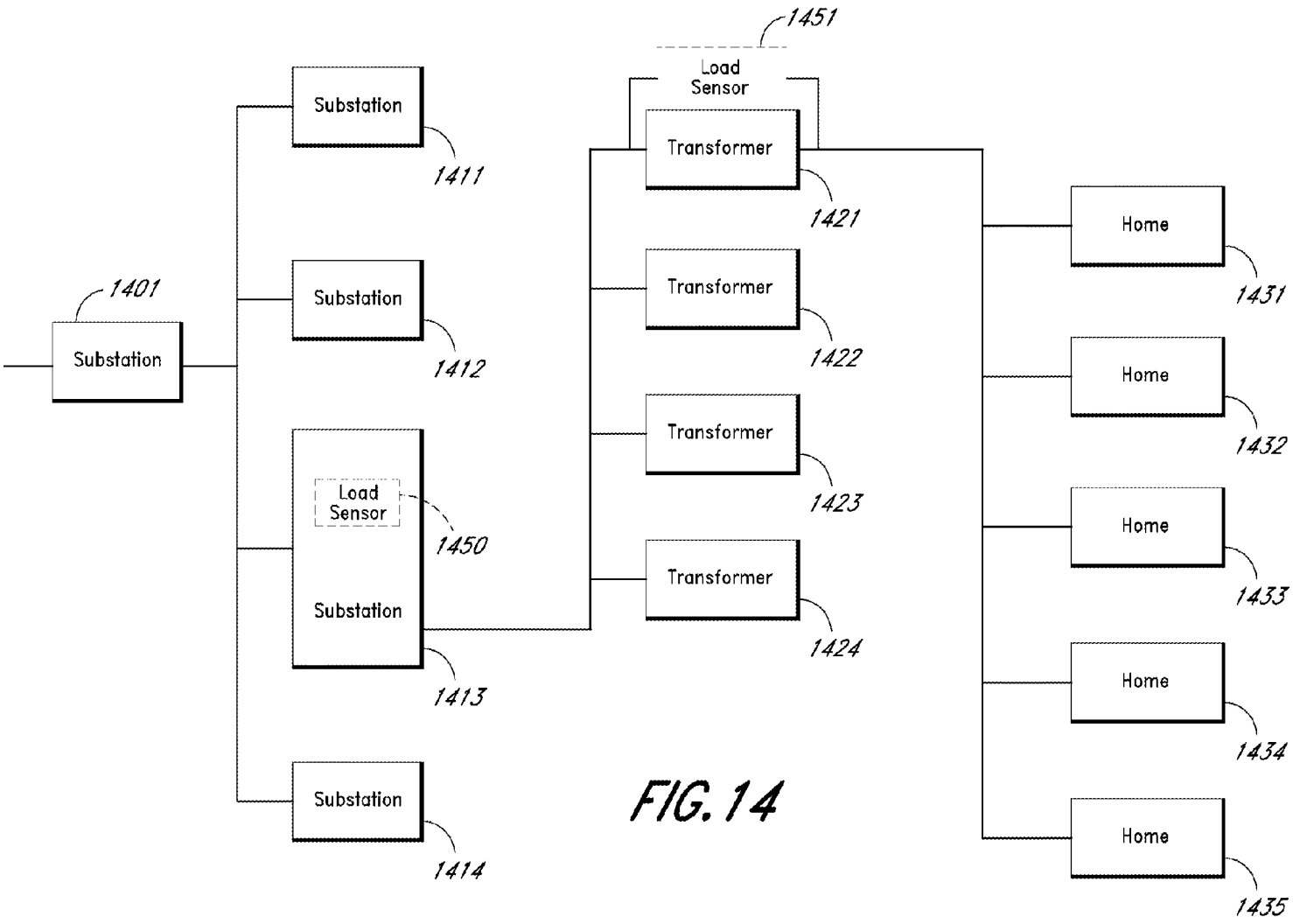
FIG. 14 shows an electric distribution system with automatic downstream load control.

FIG. 14 shows an electric distribution system 1400 with automatic downstream load control. In the system 1400, power is provided to a substation 1401. The substation 1401 provides power to a plurality of substations 1411-1414. Each of the substations 1411-1414 provides power to a plurality of transformers that service homes, neighborhoods, or buildings. In FIG. 14, the substation 1413 provides power to a plurality of transformers 1421-1424. The transformer 1421 provides power to a plurality of homes 1431-1435. A load sensor 1450 is provided to the substation 1413. A load sensor 1451 is provided to the transformer 1421.

When the substation 1413 becomes overloaded (or nears overload), the load sensor 1450 sends load reduction signals to the homes and buildings serviced by the substation 1413. Thus, in FIG. 14, when the load sensor 1450 detects that the substation 1413 is overloaded, the sensor 1450 sends load reduction commands to the homes/buildings serviced by the transformers 1421-1424. In one embodiment, the load sensor 1450 uses powerline networking to send load reduction commands to the homes/buildings serviced by the transformers 1421-1424. In one embodiment, the load sensor 1450 uses wireless transmission to send load reduction commands to the homes/buildings serviced by the transformers 1421-1424. In one embodiment, the load sensor 1450 also informs the power authority that the substation 1413 is overloaded.

When the transformer 1421 becomes overloaded (or nears overload), the load sensor 1451 sends load reduction signals to the homes and buildings serviced by the transformer 1421. Thus, in FIG. 14, when the load sensor 1451 detects that the transformer 1421 is overloaded, the sensor 1451 sends load reduction commands to the homes 1431-1435. In one embodiment, the load sensor 1451 uses powerline networking to send load reduction commands to the homes 1431-1435. In one embodiment, the load sensor 1451 uses wireless transmission to send load reduction commands to the homes 1431-1435.

The pool pump 124, electric water heater 126, and electric oven 123 are examples of relatively low-priority relatively high-load devices. Although these relatively low-priority devices can be preemptively shut down during periods of high electrical demand, it is not desirable to shut down such devices indefinitely.

Figure 15:
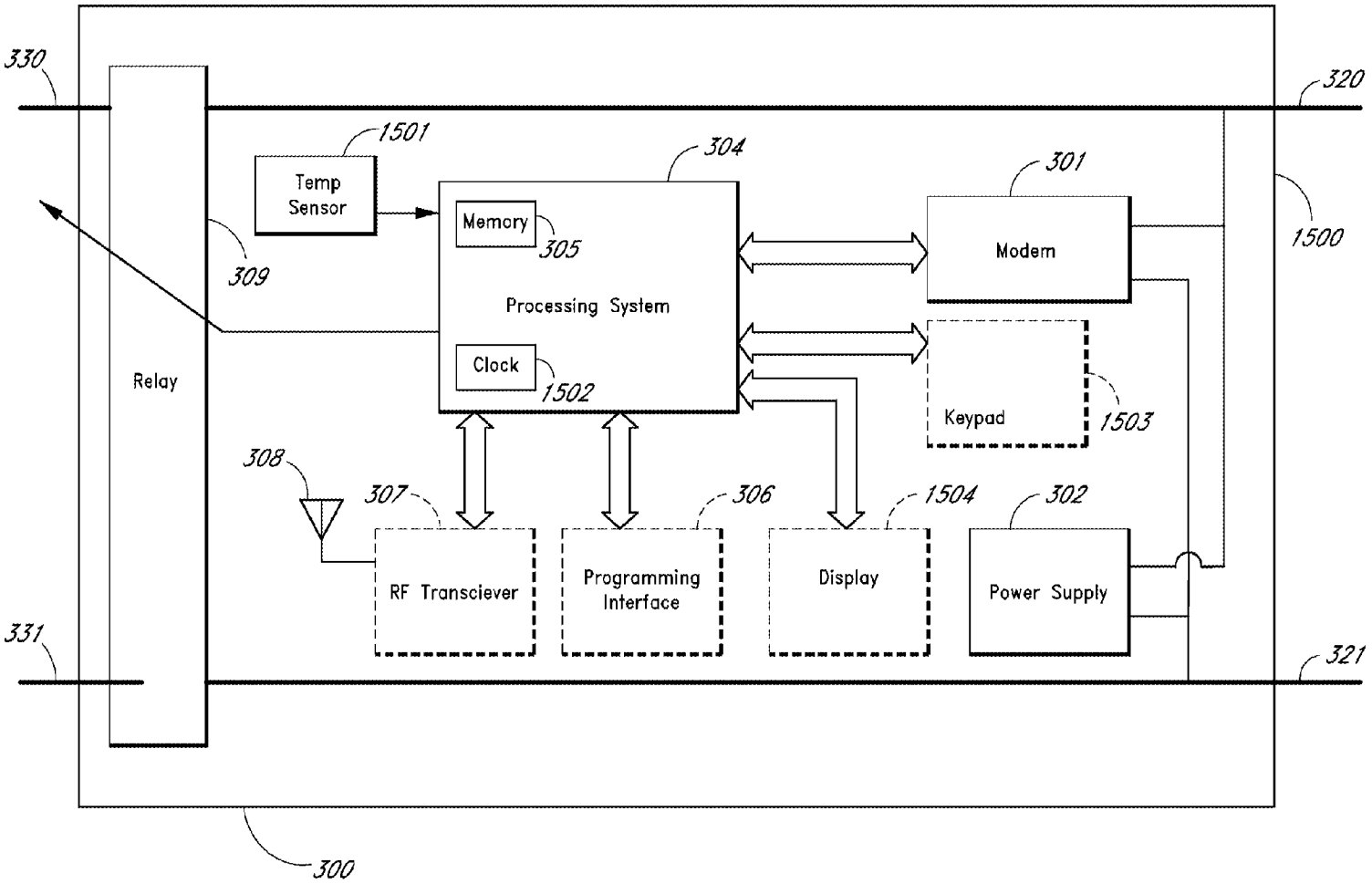
FIG. 15 shows a load-control device that controls power to a relatively high-load device using, at least in part, ambient temperature information.

FIG. 15 shows a load-control device that controls power to a relatively high-load device using, at least in part, ambient temperature information. The load control device 1500 can be configured as a circuit breaker (similar to the load control device 300) and/or the load control device 1500 can be configured as a separate controller to control a desired relatively-high load device. In the device 1500, the electrical power inputs 320, 321 are provided to the optional modem 301, to the power supply 302, and to the power relay 309. Data from the optional modem 301 is provided to a processing system 304 that includes a memory 305. In one embodiment, the memory 305 includes a non-volatile memory. An ambient temperature sensor 1501 provides ambient temperature data to the processing system 304. An optional programming interface 306 (also known as a data interface) is provided to the processing system 304. An optional Radio Frequency (RF) transceiver 307 (having an antenna 308) is provided to the processing system 304. The modem 301, the programming interface 306, and the transceiver 307 provide data interfaces to the processing system 304. In one embodiment an optional keypad (or user interface device) 1503 is provided to allow a user to input commands (e.g., time, start time, stop time, etc.). In one embodiment, an optional display 1504 is provided to display information to a user. A clock module 1502 is provided to the processing system 304 to provide time of day information to the processing system 304.

The control output from the processing system 304 is provided to the control input of the power relay 309. In one embodiment, the power relay 309 includes a solid-state relay. In one embodiment, the power relay 309 includes a solid-state relay using high-power solid state devices (e.g., triacs, Insulated Gate Bipolar Transistors, Power MOSFETS, etc.). In one embodiment, the power relay 309 includes a mechanical relay. In one embodiment, the power relay 309 is part of a circuit-breaker mechanism that allows the circuit breaker to be switched on and off electrically. In one embodiment, the relay 309 is configured as a double-pole relay that switches the connection between the input terminal 320 and the output terminal 330 as well as the connection between the input terminal 321 and the output terminal 331. In one embodiment, the input terminal 321 is provided to the output terminal 331 and the relay 309 is configured as a single-pole relay that switches the connection between the input terminal 320 and the output terminal 330. In one embodiment, the load-control device is configured as a replacement for a double-pole circuit breaker. In one embodiment, the relay 309 includes a Ground Fault Interrupter (GFI) circuit to cause the relay 309 to open when a ground fault is detected.

In one embodiment, the modem 301 facilitates one-way communication to allow the processing system 304 to receive instructions and/or data from the injector 201 or other power line communication device. In one embodiment, the modem 301 facilitates two-way communication, to allow the processing system 304 to receive instructions and/or data from the injector 201 or other power line communication device and to send data to the injector 201 or to other power line communication devices.

The processing system 304 uses the ambient temperature information from the temperature sensor 1501 and, optionally, time of day information from the clock 1502 to, at least in part, determine when to command the relay 309 to close (and thus, provide output power to the output lines 330, 301) and thus, provide power to the electrical equipment controlled by the load-control device 1500.

For example, use of an electric oven during periods of high ambient temperature (when cooling loads are high) increased the load on the electrical power system. Using an electric oven during period of high cooling load causes increased electrical loads to power the oven and increased electrical loads because the air conditions must remove the heat generated by the oven. Thus, in one embodiment, the load control device 1500 is provided to an electric oven and the processing system 304 is configured to open the relay 309 when the ambient temperature exceeds a set threshold.

While an electric oven can be disabled indefinitely without substantial inconvenience or harm, other devices such as pool pumps or electric water heaters should not be turned off indefinitely. However, devices such as pool pumps, electric water heaters, etc., do not necessarily need to be run during the hottest part of the day (e.g., mid afternoon) when cooling loads are highest and the threat of brownouts or blackouts is highest. Thus, in one embodiment, the load control device 1500 is provided to a device such as a pool pump, water fountain pump, electric water heater, etc, and the processing system 304 is configured to open the relay 309 during periods of relatively higher ambient temperature (e.g., during the hottest part of the day when the ambient temperature exceeds a set threshold) and the processing system 304 is configured to close the relay 309 during cooler parts of the day and/or on a scheduled basis.

For example, a pool pump is traditionally operated for a fixed period of time each day. During periods of relatively moderate temperatures, when cooling loads are not expected to strain the power system, the load control device 1500 can run the pool pump during the day or at any time programmed by the user. During periods of relatively high ambient temperature (e.g., during summer, during a heat wave, etc.), when cooling loads are relatively high, the processor 304 in the load control device 1500 defers operation of the pool pump to the cooler hours of night, early morning, etc. Thus, in one embodiment, the load control device 1500 is configured as a pool pump timer that allows a user to specify a start and stop time for operating the pool pump. During periods of relatively moderate ambient temperature, the processing system 304 will control the relay 309 to cause the pool pump to operate at the times specified by the user. During periods of relatively high ambient temperature, the processing system 304 will override the user commands and control the relay 309 to cause the pool pump to operate during the relatively cooler portions of the day. In one embodiment the processing system 304 will operate the pool pump during the relatively cooler portions of the day for the amount of time specified by the user for normal operation (e.g., the processing system 304 will time-shift the user-specified run times).

In one embodiment, during periods of relatively high ambient temperature, the processing system 304 will operate the pool pump during the relatively cooler portions of the day for a relatively shorter amount of time than used in normal operation. In one embodiment, the processing system 304 computes how much time to run the pool pump according to a schedule based on the ambient temperature throughout the day and how much the pool pump has been run during the previous few days. Thus, for example, although a pool pump is generally run everyday, missing one day is not generally problematic. Moreover, running the pool pump for shorter periods for a few days is not generally problematic. What can be problematic is failing to run the pool pump for enough time over a period of a week or so. Thus, in one embodiment, if a period of relatively moderate weather is followed by a period of relatively hot weather, the processing system 304 can defer operation of the pool pump entirely for one or two days. The processing system 304 can also run the pool pump on a reduced schedule for a few days or weeks in order to reduce power loads. When the weather moderates, the processing system 304 can then return the pool pump timing to normal operation or even increase the time the pump is run for a few days in order to at least partially catch up on the missed time.

In one embodiment, the processing system 304 schedules operation of the pool pump based on the severity of a heat wave. Thus, for example, during a relatively short but relatively severe heat wave, the processing system 304 can turn off the pool pump for a few days. During an extended, but relatively less severe heat wave, the processing system 304 can cause the pool pump to run on a reduced schedule and during times of day when the electrical load due to cooling is relatively lighter.

Electric water heaters are another type of relatively high-load device that can be temporarily shut down during periods of relatively high electrical demand. However, unlike a pool pump, consumers will generally not tolerate the loss of hot water for extended periods. Thus, in one embodiment, the load control device 1500 is provided to an electric hot water heater and configured to open the relay 309 during periods of relatively high electrical load (e.g., during afternoons when ambient temperature is relatively high) but still allow the hot water heater to operate during the night and morning hours when cooling loads are relatively lighter.

In one embodiment, the programming system 304 uses the memory 305 to keep a log file of the ambient temperatures and/or actions taken (e.g., when the relay 309 was turned on and off, how long the relay 309 was off, etc.). In one embodiment, the programming interface 306 can be used to read the log file. In one embodiment, the log file can be read using the modem 301. In one embodiment, the log file can be read using the RF transceiver 307. In one embodiment, data from the log file can be read using an Automatic Meter Reading (AMR) system. In one embodiment, an AMR system interfaces with the processing system 304 via the modem 301, the programming interface 306 and/or the transceiver 307.

The load-control device 1500 can be built into the relatively high-load device. The load-control device 1500 can be added to a relatively high-load device as a retrofit. In one embodiment, the load-control device 1500 is built into a circuit breaker, such as, for example, the double-pole circuit breakers 112-115 that provide power to a relatively high-load device. However, some devices, such as, for example, electric hot water heaters, electric ovens, and the like are located indoors. Thus, in one embodiment, shown in FIG. 16 a temperature measurement system 1601 is provided to measure the ambient temperature and provide the ambient temperature data to the load-control device 1500. In one embodiment, the temperature measurement system 1601 modulates the temperature data on to a carrier signal and signal the modulated signal into the power lines. In one embodiment, the temperature measurement system 1601 modulates the temperature data on to a radio frequency carrier signal and wirelessly transmits the modulated signal to the load control device 1500 to be received by the RF transceiver 307.

Figure 16:
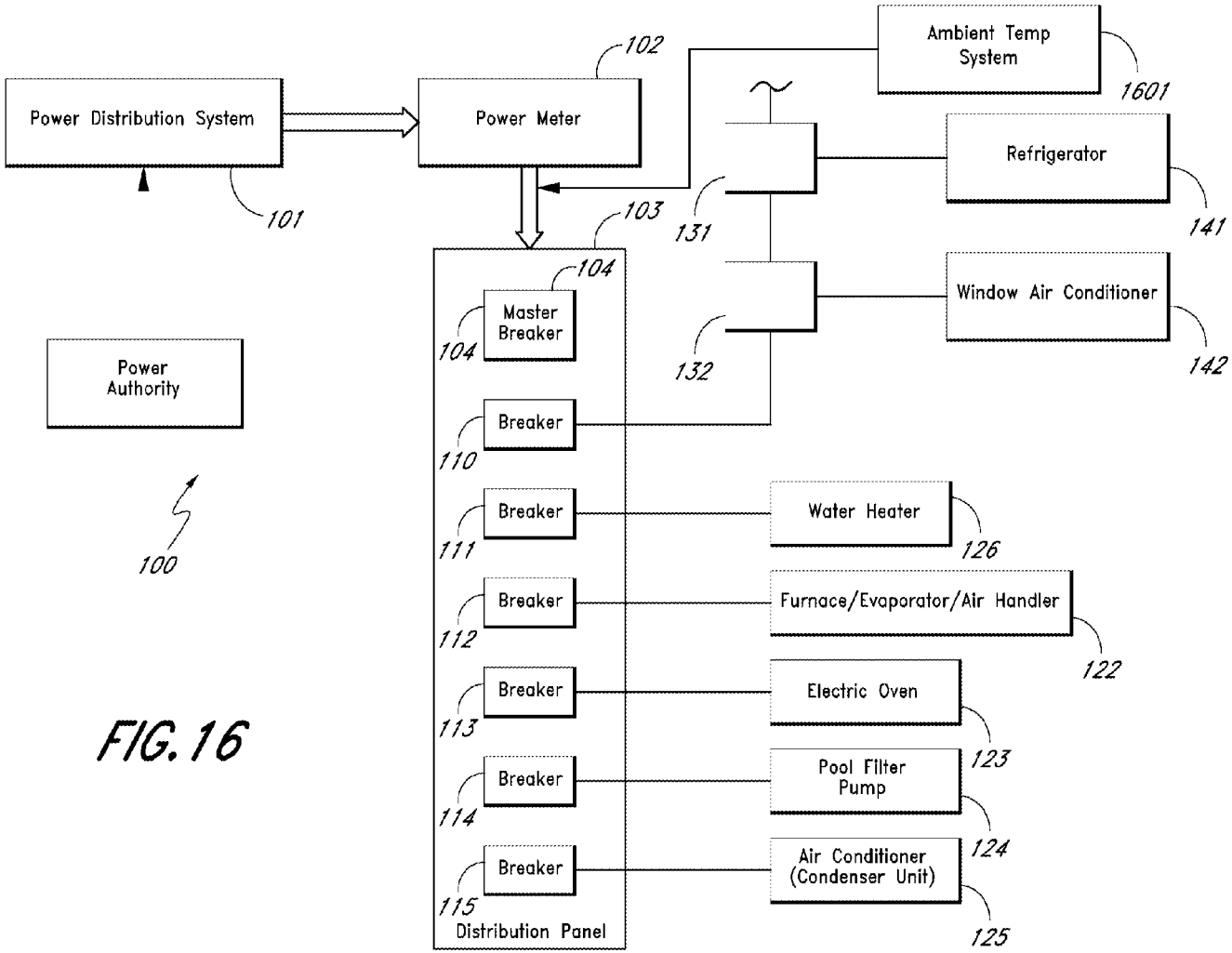
FIG. 16 shows the power distribution system from FIG. 1 with the inclusion of an ambient temperature data injector for using the power lines to send ambient temperature information to indoor devices, such as, for example, hot water heaters, ovens, etc.

FIG. 16 shows the power distribution system from FIG. 1 with the inclusion of an ambient temperature data injector for using the power lines to send ambient temperature information to indoor devices, such as, for example, hot water heaters, ovens, etc.

One of ordinary skill in the art will recognize that other electrical devices can also be controlled by the temperature-controlled load-control device. For example, electric dryers, microwave ovens, electric range, electrical outlets, incandescent lights, and the like can be controlled. In one embodiment, devices are controlled according to priority, the electrical load presented by the device, ambient temperature. Thus, for example, a relatively high-load relatively low priority device, such as an electric oven, electric range, electric dryer etc., would typically be powered down before a relatively low load device such as, for example, a microwave oven, incandescent light, etc.

In one embodiment, one or more temperature-controlled load-control devices are configured to power down controlled devices based on a time-weighted function of the ambient temperature. In such a system, a relatively high ambient temperature occurring for even a relatively short time will cause the load-control devices to start powering down the controlled devices. However, a relatively modest rise in ambient temperature occurring for a longer period of time will also cause the load-control devices to start powering down the controlled devices. Thus, in one embodiment, the longer the ambient temperature has been elevated, the lower the ambient temperature used as the set point temperature for the load-control devices. One of ordinary skill in the art will recognize that different set point algorithms can be used in different load control devices based on the usage patterns of the device, the priority of the device, the need (or lack thereof) to operate the device at regular intervals, etc.

Temperature-based control of pools (e.g. swimming pools) can also be coordinated with operation of a pool heater. It is common in many locales, even locales that experience significant heat, to have a heater for heating a swimming pool and/or spa (hereinafter called simply a "pool"). For a larger pool, such as a swimming pool, such heaters are generally fueled by propane or natural gas. Heaters for smaller pools such as spas, hot-tubs, small swimming pools, etc. sometimes use electric heating. Regardless of the type of heating used (electric, natural gas, propane, fuel oil, etc.) the cost of heating a pool can be substantial.

Figure 17:
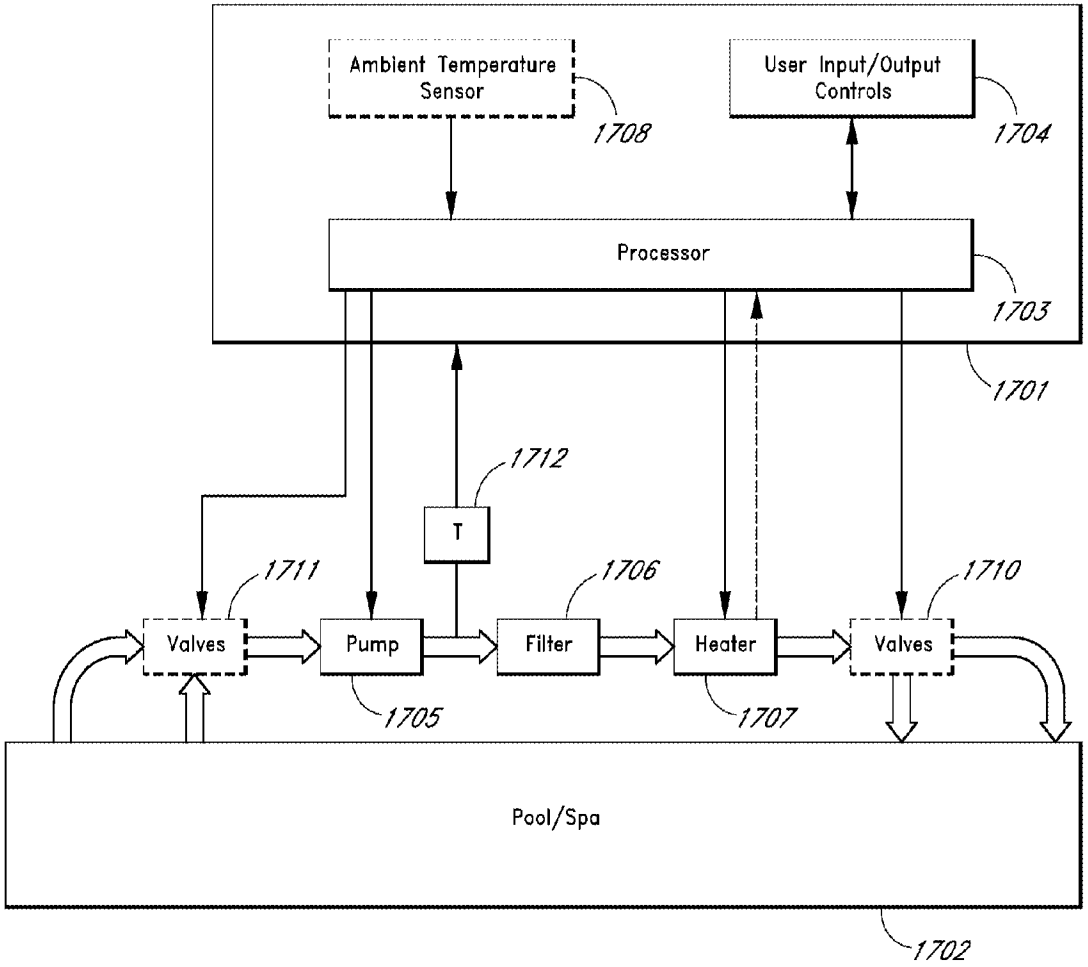
FIG. 17 shows a system for controlling operation of a filter pump and heater in a swimming pool or spa.

FIG. 17 shows a pool control system 1701 for controlling operation of a filter pump 1705 and heater 1707 provided to a swimming pool (and/or spa) 1702. Water from the pool 1702 is provided to a pump 1705. In one embodiment, the water is provided to the pump 1705 via one or more optional supply valves 1711. Water from the pump 1705 is provided through a filter 1706 to a heater 1707. Water from the heater 1707 is provided back to the pool/spa 1702 via one or more return valves 1710. In one embodiment, water from the heater 1707 is provided to the one or more optional return valves 1710. The optional valves 1711 control the supply of water from various locations in the pool or spa. The optional return valves 1710 control the allocation or return water to various locations in the pool or spa. Thus, by proper setting of the valves 1710 and 1711 water can be pulled from various selected portions of the pool or spa and returned to various selected portions of the pool or spa. A temperature sensor 1712 is provided to sense water temperature of the water from the pool/spa 1702. In one embodiment, the control system 1701 includes operation as described above in connection with FIGS. 1-16 and can receive shutdown commands and other commands In the pool control system 1701, one or more user input/output controls 1704 are provided to a processor 1703. The temperature sensor 1712 is provided to the processor 1703. An optional ambient temperature sensor 1708 is also provided to the processor 1703. The user controls 1704 include controls for providing user inputs to the processor 1703, such as, for example, buttons, a keypad, a touch screen, a computer network interface, a wireless network interface, etc. In one embodiment, the controls 1704 are configured as a wired or wireless network interface such that the user can use a personal computer and/or cellular telephone to send commands to the processor 1703.

A control output from the pool control system 1701 is provided to control operation of the pump 1705. In one embodiment, the pump 1705 is a variable-speed pump and the pool control system 1701 controls both the on/off state and speed of the pump 1705. A control output from the pool control system 1701 is provided to control operation of the heater 1707. In one embodiment, data from an output of the heater 1707 is provided to an input of the pool control system 1701. In one embodiment, the supply valves 1711 are electrically-controlled valves controlled by the processor 1703. In one embodiment, the return valves 1710 are electrically-controlled valves controlled by the processor 1703.

Having a pool control system 1701 that can control both the pump 1705 and the heater 1707 provides a level of coordinated control not found in the prior art. For example, in one embodiment, the user uses the input/output controls 1704 to specify a future time when the pool/spa 1702 will be used and, optionally, the desired temperature for the water. The pool control system 1701 calculates the time needed to bring the water to the desired temperature and turns on the pump 1705 and heater 1707 in advance such that the water will be at the desired temperature at the specified time.

In one embodiment, the control system 1701 coordinates operation of the pump 1705 and the heater 1707. It is known that the pump should run when the heater 1707 is on (heating). Thus, prior art systems are wired such that the heater shuts off when the pump is not operating. However, prior art systems typically control the pump (and thus the heater) based on a simple time-of-day timer such that the pump runs, for example, between 10:00 AM and 5:00 PM each day. By contrast, in one embodiment, the control system 1701 schedules operation of the pump 1705 and the heater 1707 such that the water in the pool/spa 1702 will be at the desired temperature at times specified by the user. Thus, for example, if the user specifies that the pool is to be at a desired temperature between 1:00 PM and 5:00 PM on Saturday afternoon, the control system 1701 will calculate when the heater 1707 must be activated in order to heat the water to the desired temperature by 1:00 PM on Saturday. The calculation of when to turn on the heater 1707 is based, at least in part, on the current water temperature, the desire water temperature, and the speed at which the heater raises the temperature of the water in the pool/spa 1702.

In one embodiment, the user provides to the control system 1701 information regarding the BTU heating capability of the heater 1707 and the volume of water in the pool/spa 1702 to allow the control system 1701 to calculate the amount of time required to heat the water. In one embodiment, the control system 1701 determines the amount of time needed to heat the water based on past measurements of how fast the heater 1707 was able to increase the temperature of the water in the pool. In one embodiment, the control system 1701 determines the amount of time needed to heat the water based on estimates for typical pool/heater installations. In one embodiment, the control system 1701 calculates the time needed to heat the water based one or more of the following data: the BUT heating ability of the heater 1707, the volume water in the of the pool/spa 1702, the current water temperature, the desired water temperature, estimates based on typical pool/spa-heater systems, and/or measurements of how fast the heater 1707 was able to increase the temperature of the water in the pool.

As described above, in one embodiment, the control system 1701 coordinates operation of the pump 1705 and the heater 1707 to provide energy efficiency and to minimize operation of the pump 1705. Operation of the pump 1705 is scheduled according to an average value over a specified time period so that the pump 1705 is operated long enough to provide filtering of the water while taking into account the periods in which the pump 1705 must be operated in order to run the heater 1707. Thus, for example, if the control system 1701 determines that the heater 1707 (and pump 1705) will be operated for a relatively long period of time on Friday and Saturday in order to heat the water for use on Saturday, then the control system 1701 will reduce the amount of time the pump is operated during the middle of the week (e.g., Monday through Thursday) such that the pump 1705 is operated enough to filter the water but is not operated more than deemed needed to filter the water. In one embodiment, the control system 1701 operates the pump 1705 for at least a minimum specified time each during each 24-hour period.

In one embodiment, the control system 1701 is configured to operate the pump 1705 for at least a specified average amount of time over a specified time window. In one embodiment, the specified time window is a sliding window such that the control system 1701 operates the pump 1705 for at least a specified amount of time over a time window that includes one or more days in the past and one or more days projected into in the future. Thus, for example, if the control system 1701 is projecting that the pump will be operated for a relatively extended period of time on a future date within the time window, then the control system 1701 will defer current operation of the pump 1705 accordingly. However, if settings change (e.g., the user cancels or changes the request to heat the pool at some later date) then the control system 1701 will re-calculate scheduling operation of the pump 1705. Thus, assume a scenario where the control system 1701 is deferring operation of the pump 1705 expecting that the pump will be used in connection with the heater 1707 to heat the water for use later in the week, and the user cancels the request for heated water, then the control system 1701 can stop deferring operation of the pump 1705 and can operate the pump 1705 to make up for filtering that has already been deferred.

In one embodiment, the valves 1711 and 1710 are manually-operated. In one embodiment, the valves 1711 and 1710 are controlled by the control system 1701 such that the control system 1701 can control heating and filtering (pumping) of the water in the pool and an associated spa. By setting the valves 1711 and 1710 in a first setting, the control system 1701 can draw water from the pool and return water to the pool. By setting the valves 1711 and 1710 in a second setting, the control system 1701 can draw water from the pool and return water to the spa. By setting the valves 1711 and 1710 in a third setting, the control system 1701 can draw water from the spa and return water to the spa. In this manner, the control system 1701 can separately control the temperature of the water in the pool and the spa and can run separate filtering cycles for the water in the pool and the spa.

In one embodiment, the pump 1705 provides one or more operating speeds. With a multi-speed and/or variable-speed pump 1705 the control system 1701 can schedule the speed of operation of the pump 1705 differently to provide efficient operation for filtering, heating, or other water treatment processes. Thus, the control system 1701 can run the pump 1705 at a first speed when the pump is being operated to filter the water, the control system 1701 can run the pump 1705 at a second speed when the pump is being operated in connection with the heater 1707, and the control system 1701 can operate the pump 1705 at a third speed when pumping in connection with a water treatment system, such as, for example, a salt system, a solar heating system, etc. In each case, the control system 1701 can operate the pump 1705 at a speed that provides efficient use of the pump 1705.

In one embodiment, the control system 1701 turns the pump and heater 1707 off when the water has reached a desired temperature.

In one embodiment, the control system 1701 uses an adaptive algorithm that learns over time how the heater 1707 and other pool systems function so that the control system 1701 can adaptively adjust operation of the pump 1705 and heater 1707 to provided improved efficiency.

In one embodiment, the heater 1707 includes solar heating capability as well as active heating capability (e.g., natural gas fired heating). In such an embodiment, the control system 1701 can include the two modes of heater operation in the calculation of when to run the pump 1705 for greater efficiency. Thus, for example, the control system 1701 can run the pump 1705 during the day when solar heating is available and thus reduce the amount of heating required during the night time hours and still bring the water to the desired temperature at the desired time.

In one embodiment, the control system 1701 schedules operation of the pump 1705 to reduce blackouts and/or brownouts by not running the pump during times of high electrical system loading (e.g., hot summer afternoons). The control system 1701 can also schedule operation of the pump during period when electrical rates are lower (e.g., night time). In one embodiment, the user can instruct the control system 1701 how to prioritize operation of the pump 1705 (e.g., minimum energy usage, minimum cost, maximum convenience, etc.). The user can also schedule different priorities for different times. For example, during the week when the pool/spa 1702 is not used, the user can instruct the control system 1701 to operate the pump for maximum cost savings (e.g., run the pump at night when electrical rates a lower), and for maximum convenience during the weekend (e.g., run the pump as needed to have the water at the desired temperature at the specified time).

Although various embodiments have been described above, other embodiments will be within the skill of one of ordinary skill in the art. Thus, the invention is limited only by the claims.

What is claimed is:

1. An apparatus for energy efficient operation of a pool pump and heater system, comprising:

a pump;

a control system configured to receive water temperature data from water in a pool serviced by said pump; [and] *and* a heater that heats said water, said control system calculating a start time to turn on said heater and said pump such that said water will be at a desired temperature at a desired future time, said control system calculating filtration times to run said pump before said start time, said filtration times computed based at least in part on said start time and [at least in part on a desired average of filtration time operating over a time period, said control system running said pump during said filtration times, said control system activating said heater at said start time] *a specified average amount of time over a specified time window so that said pump is operated to provide filtering of the water while taking into account periods of pump operation to run the heater, wherein the specified time window is a sliding window such that the control system operates said pump for at least a specified amount of time over a time window that includes a plurality of days in the past and one or more days projected into the future, and wherein when said control system has deferred operation of the pump entirely for at least one past day within the specified time window, said control system increases the time the pump is to be operated to at least partially catch up on the filtration time missed during deferred operation of the pump in order to meet the specified average amount of time.*

2. The apparatus of claim 1, further configured to receive a shutdown command.

3. The apparatus of claim 1, further configured to receive a command to shutdown for a specified period of time.

4. The apparatus of claim 1, said apparatus further comprising a modem.

5. The apparatus of claim 1, said apparatus further comprising a power line modem.

6. The apparatus of claim 1, said apparatus further comprising a wireless modem.

7. The apparatus of claim 1, wherein said control system controls an operating speed of said pump.

8. The apparatus of claim 1, wherein said control system operates said pump for at least a specified amount of time during a 24-hour period.

9. The apparatus of claim 1, further comprising a power line networking modem configured to receive ambient temperature data and provide said ambient temperature data to said control system.

10. The apparatus of claim 1, further comprising a wireless receiver configured to receive ambient temperature data and provide said ambient temperature data to said control system.

11. The apparatus of claim 1, wherein said [desired] *specified* average *amount of time* is computed over a 24-hour time period.

12. The apparatus of claim 1, wherein said [desired] *specified* average *amount of time* is computed over a one week time period.

13. The apparatus of claim 1, wherein said [desired] *specified* average *amount of time* is computed over a time period specified by a user.

14. An apparatus comprising:

a pump for a pool;

a heater configured to heat water in the pool;

a control system configured to run the pump, activate the heater, and receive temperature data of water in the pool serviced by the pump;

wherein the control system calculates a start time to turn on the heater and the pump such that the water in the pool will be at a desired temperature at a desired future time, the control system calculating filtration times to run the pump, the filtration times being computed based at least in part on the start time and [at least in part on a desired average of filtration time operating over a time period] *a specified average amount of time over a specified time window so that said pump is operated to provide filtering of the water while taking into account periods of pump operation to run the heater, wherein the specified time window is a sliding window such that*

*the control system operates said pump for at least a specified amount of time over a time window that includes at least two days in the past and one or more days projected into the future, and wherein when said control system had deferred operation of the pump entirely for at least one day within the at least two past days, said control system increases the time the pump is to be operated to at least partially catch up on filtration time missed during deferred operation of the pump to meet the specified average amount of time, wherein the pump runs at a first speed during the filtration times and at a second speed during operation of the heater.*

*15. The apparatus of claim 14, wherein said specified average amount of time is computed over a 24-hour time period.*

*16. The apparatus of claim 14, wherein said specified average amount of time is computed over a one week time period.*

*17. The apparatus of claim 14, wherein said specified average amount of time is computed over a time period specified by a user.*

*18. The apparatus of claim 14, further configured to: receive a command to shut down the heater for a specified period of time; and adjust the filtration time to take into account the specified period of time the heater is shutdown.*

*19. The apparatus of claim 14, further configured to defer operation of the pump at a first time if the control system is scheduled to operate the pump at a second time, wherein the second time is schedule to occur after the first time.*

*20. A system comprising:*

*a pump for a pool;*

*a heater configured to heat water in the pool;*

*a control system that coordinates operation of the pump and the heater to minimize operation of the pump by maintaining a scheduling window during which it schedules a heater and pump runtime to heat the pool to a desired temperature within the scheduling window and a pump only runtime for filtering the pool within the scheduling window,*

*wherein when the control system projects that the pump is scheduled to run in connection with the heater for a first future period time within the scheduling window, the control system defers a currently scheduled operation of the pump to thereby defer filtering,*

*wherein when the control system receives a notice that the scheduled run during the first future period of time is cancelled, the control system ceases deferred operation of the pump and can operate the pump to filter the water to make up for the deferred filtering.*

*21. The system of claim 20, wherein the control system re-calculates the heater and pump runtime and the pump only runtime in response to a settings change.*

*22. The system of claim 20, wherein the pump runs at a first speed during the pump only runtime and at a second speed during the heater and pump runtime.*

*23. The system of claim 22, further comprising:*

*a solar heating system;*

*wherein the scheduling window schedules a solar heating system and pump runtime; and*

*wherein the pump runs at a third speed during the solar heating system and pump runtime.*

*24. The system of claim 20, wherein the heater comprises a solar heating mode and a gas powered heating mode, and wherein the control system uses the solar heating mode during the day when solar heating is available and uses the gas powered heating mode at night when electrical rates are lower.*

* * * * *